US012108333B2

(12) United States Patent
Ma et al.

(10) Patent No.: US 12,108,333 B2
(45) Date of Patent: Oct. 1, 2024

(54) POWER SAVING TECHNIQUES

(71) Applicant: ZTE Corporation, Guangdong (CN)

(72) Inventors: Xiaoying Ma, Guangdong (CN); Jun Xu, Guangdong (CN); Mengzhu Chen, Guangdong (CN); Hao Wu, Guangdong (CN); Qiujin Guo, Guangdong (CN); Xuan Ma, Guangdong (CN); Focai Peng, Guangdong (CN)

(73) Assignee: ZTE Corporation, Shenzhen (CN)

( * ) Notice: Subject to any disclaimer, the term of this patent is extended or adjusted under 35 U.S.C. 154(b) by 264 days.

(21) Appl. No.: 17/736,967

(22) Filed: May 4, 2022

(65) Prior Publication Data
US 2022/0303899 A1    Sep. 22, 2022

Related U.S. Application Data

(63) Continuation of application No. PCT/CN2019/116583, filed on Nov. 8, 2019.

(51) Int. Cl.
G06F 11/00 (2006.01)
H04W 24/08 (2009.01)
H04W 52/02 (2009.01)
H04W 72/12 (2023.01)
H04W 76/28 (2018.01)

(52) U.S. Cl.
CPC ....... *H04W 52/0229* (2013.01); *H04W 24/08* (2013.01); *H04W 52/0209* (2013.01); *H04W 72/12* (2013.01); *H04W 76/28* (2018.02)

(58) Field of Classification Search
CPC . H04W 52/0209; H04W 76/28; H04W 52/02; H04W 24/10
See application file for complete search history.

(56) References Cited

U.S. PATENT DOCUMENTS

| 8,787,231 | B2 | 7/2014 | Jeong et al. |
| 9,107,163 | B2 | 8/2015 | Hofmann et al. |
| 9,432,927 | B2 | 8/2016 | Kim et al. |

(Continued)

FOREIGN PATENT DOCUMENTS

| CN | 102300294 A | 12/2011 |
| CN | 102474347 A | 5/2012 |

(Continued)

OTHER PUBLICATIONS

Spreadtrum Communications, "Discussion on cross-slot scheduling for UE power saving," 3GPP TSG RAN WG1 Meeting #98-Bis, R1-1910018, Chongqing, China, Oct. 14-20, 2019, 4 pages.

(Continued)

*Primary Examiner* — Shantell L Heiber
(74) *Attorney, Agent, or Firm* — Perkins Coie LLP

(57) ABSTRACT

Techniques are described to enable a user equipment (UE) to save power consumption and/or can enable the UE to acquire the channel state in time without reducing the UE's data transmission efficiency. An example technique includes determining, by the communication device, an operating mode based on a first signaling, and operating the communication device in the operating mode, where the operating mode includes any one of a normal mode, a first power saving mode, a second power saving mode, a third power saving mode, or a fourth power saving mode.

12 Claims, 5 Drawing Sheets

(56) References Cited

U.S. PATENT DOCUMENTS

| | | | |
|---|---|---|---|
| 9,491,648 B2 | 11/2016 | Choi et al. | |
| 9,565,714 B2 | 2/2017 | Lee et al. | |
| 10,091,833 B2 | 10/2018 | Lee et al. | |
| 10,779,276 B2 | 9/2020 | Ji et al. | |
| 10,827,487 B2 | 11/2020 | Huang et al. | |
| 10,952,231 B2 | 3/2021 | Liou | |
| 2010/0234037 A1 | 9/2010 | Terry et al. | |
| 2012/0213137 A1 | 8/2012 | Jeong et al. | |
| 2013/0279353 A1* | 10/2013 | Ji | H04W 24/10 370/252 |
| 2014/0105049 A1* | 4/2014 | Kim | H04L 5/0057 370/252 |
| 2015/0117284 A1* | 4/2015 | Baldemair | H04W 52/0216 370/311 |
| 2015/0163740 A1 | 6/2015 | Lee et al. | |
| 2015/0312775 A1 | 10/2015 | Yi et al. | |
| 2016/0227521 A1 | 8/2016 | Han et al. | |
| 2018/0242243 A1* | 8/2018 | Kela | H04L 5/0057 |
| 2018/0332533 A1 | 11/2018 | Bhattad et al. | |
| 2019/0149380 A1 | 5/2019 | Babaei et al. | |
| 2019/0149421 A1 | 5/2019 | Jin et al. | |
| 2019/0215897 A1 | 7/2019 | Babaei et al. | |
| 2019/0254056 A1 | 8/2019 | Salah et al. | |
| 2019/0274032 A1 | 9/2019 | Chatterjee et al. | |
| 2019/0306737 A1 | 10/2019 | Kwak et al. | |
| 2020/0037248 A1* | 1/2020 | Zhou | H04L 5/0048 |
| 2021/0029637 A1 | 1/2021 | Jiang et al. | |
| 2021/0029683 A1 | 1/2021 | Jiang et al. | |
| 2021/0377864 A1 | 12/2021 | Li | |
| 2021/0385831 A1 | 12/2021 | Nogami et al. | |
| 2022/0167267 A1 | 5/2022 | Ma et al. | |

FOREIGN PATENT DOCUMENTS

| | | |
|---|---|---|
| CN | 102932881 A | 2/2013 |
| CN | 103493549 A | 1/2014 |
| CN | 103581884 A | 2/2014 |
| CN | 103620984 A | 3/2014 |
| CN | 104349491 A | 2/2015 |
| CN | 104871575 A | 8/2015 |
| CN | 104956755 A | 9/2015 |
| CN | 107613577 A | 1/2018 |
| CN | 108141823 A | 6/2018 |
| CN | 109496452 A | 3/2019 |
| CN | 109952789 A | 6/2019 |
| CN | 110121211 A | 8/2019 |
| CN | 110324904 A | 10/2019 |
| CN | 110381568 A | 10/2019 |
| CN | 110381569 A | 10/2019 |
| CN | 111083770 A | 4/2020 |
| EP | 3911085 A1 | 11/2021 |
| JP | 2015-522228 A | 8/2015 |
| WO | 2014063369 A1 | 5/2014 |
| WO | 2020223654 A1 | 11/2020 |

OTHER PUBLICATIONS

Huawei et al., "Procedure of cross-slot scheduling for UE power saving," 3GPP TSG RAN WG1 Meeting #98bis, R1-1910077, Chongqing, China, Oct. 14-20, 2019, 12 pages.
Samsung, "Cross-slot scheduling power saving techniques," 363GPP TSG RAN WG1 #98bis, R1-1910498, Chongqing, China, Oct. 14-18, 2019, 11 pages.
Motorola Mobility et al., "Cross-slot scheduling for power saving," 3GPP TSG RAN WG1 #98bis, R1-1911031, Chongqing, China, Oct. 14-20, 2019, 8 pages.
Qualcomm Incorporated, "Cross-slot scheduling power saving techniques, " 3GPP TSG-RAN WG1 #98bis, R1-1911130, Chongqing, China, Oct. 14-20, 2019, 18 pages.
Nokia et al., "Procedure of cross-slot scheduling power saving techniques, " 3GPP TSG RAN WG1 meeting #98bis, R1-1911246, Chongqing, China, Oct. 14-20, 2019, 5 pages.
Mediatek Inc., "Offline Summary for Cross-Slot Scheduling Adaptation," 3GPP TSG RAN WG1 Meeting #98-Bis, R1-191XXXX, Chongqing, China, Oct. 14-20, 2019, 20 pages.
Japanese office action issued in JP Patent Application No. 2022-526114, dated Apr. 5, 2023, 3 pages. English translation included.
International Search Report and Written Opinion mailed on Aug. 13, 2020 for International Application No. PCT/CN2019/116583, filed on Nov. 8, 2019 (7 pages).
European Search Report issued in EP Patent Application No. 19951582.6, dated Apr. 26, 2023, 10 pages.
Huawei et al., "PDCCH-based power saving signal/channel," 3GPP TSG RAN WG1 Meeting #98bis, R1-1910076, Chongqing, China, Oct. 14-20, 2019, 21 pages.
ZTE, "Discussion on Potential Techniques for UE Power Saving," 3GPP TSG RAN WG1 #98bis, R1-1910184, Chongqing, China, Oct. 14-20, 2019, 4 pages.
European Search Report for EP Patent Application No. 22180970.0, dated Oct. 10, 2022, 9 pages.
ZTE, "Procedure of cross-slot scheduling power saving techniques," 3GPP TSG RAN WG1 #98bis, R1-1910182, Chongqing, China, Oct. 14-20, 2019, 10 pages.
Mediatek Inc., "Summary of Cross-Slot Scheduling," 3GPP TSG RAN WG1 Meeting #96-Bis, R1-1905755, Xi'an, China, Apr. 8-12, 2019, 11 pages.
Canadian office action issued in CA Patent Application No. 3,160,520, dated Jan. 8, 2024, 9 pages.
United States Non-Final Office Action issued in U.S. Appl. No. 17/842,426, dated Nov. 30, 2023, 43 pages.
European Communication under Rule 71(3) EPC issued in EP Patent Application No. 22180970.0, dated May 19, 2023, 64 pages.
Japanese notice of allowance issued in JP Patent Application No. 2022-526114, dated Jun. 8, 2023, 3 pages.
ZTE, "Discussion on PDCCH-based power saving signal," 3GPP TSG RAN WG1 #99, R1-1911925, Reno, USA, Nov. 18-22, 2019, 12 pages.
ZTE, "Procedure of cross-slot scheduling power saving techniques," 3GPP TSG RAN WG1 #99, R1-1911926, Reno, USA, Nov. 18-22, 2019, 15 pages.
Nokia, "Corrections of cross-slot scheduling restriction and CSI/L1-RSRP measurement outside active time," 3GPP TSG-RAN WG1 Meeting #100, R1-2001447, e-meeting, Feb. 24-Mar. 6, 2020, 4 pages.
Nokia et al., "Corrections of cross-slot scheduling restriction," 3GPP TSG-RAN WG1 Meeting #101-e, R1-2005152, e-meeting, May 25-Jun. 5, 2020, 6 pages.
"Final Report of 3GPP TSG RAN WG1 #98 v2.0.0," 3GPP TSG RAN WG1 Meeting #98bis, R1-1911429, Chongqing, China, Oct. 14-18, 2019, 180 pages.
ETSI TS 138 214, V16.2.0, (Jul. 2020), Technical Specification, 5G; NR; Physical layer procedures for data (3GPP TS 38.214 version 16.2.0 Release 16), 167 pages.
ETSI TS 138 213, V16.2.0, (Jul. 2020), Technical Specification, 5G; NR; Physical layer procedures for control (3GPP TS 38.213 version 16.2.0 Release 16), 180 pages.
ETSI TS 138 212, V16.2.0, (Jul. 2020), Technical Specification, 5G; NR; Multiplexing and channel coding (3GPP TS 38.212 version 16.2.0 Release 16), 154 pages.
ETSI TS 138 300, V16.2.0, (Jul. 2020), Technical Specification, 5G; NR; NR and NG-RAN Overall description; Stage-2 '3GPP TS 38.300 version 16.2.0 Release 16), 150 pages.
ETSI TS 138 331, V16.1.0, (Jul. 2020), Technical Specification, 5G; NR; Radio Resource Control (RRC); Protocol specification (3GPP TS 38.331 version 16.1.0 Release 16), 886 pages.
ETSI TS 138 321, V16.1.0, (Jul. 2020), Technical Specification, 5G; NR; Medium Access Control (MAC) protocol specification (3GPP TS 38.321 version 16.1.0 Release 16), 153 pages.
3GPP TS 38.213, V16.1.0, (Mar. 2020), Technical Specification, 3rd Generation Partnership Project; Technical Specification Group Radio Access Network; NR; Physical layer procedures for control (Release 16), 156 pages.

(56) References Cited

OTHER PUBLICATIONS

3GPP TS 38.212, V16.1.0, (Mar. 2020), Technical Specification, 3rd Generation Partnership Project; Technical Specification Group Radio Access Network; NR; Multiplexing and channel coding (Release 16), 146 pages.
3GPP TS 38.300, V16.1.0, (Mar. 2020), Technical Specification, 3rd Generation Partnership Project; Technical Specification Group Radio Access Network; NR; NR and NG-RAN Overall Description; Stage 2 (Release 16), 133 pages.
3GPP TS 38.331, V16.2.0, (Sep. 2020), Technical Specification, 3rd Generation Partnership Project; Technical Specification Group Radio Access Network; NR; Radio Resource Control (RRC) protocol specification (Release 16), 921 pages.
3GPP TS 38.321, V16.2.0, (Sep. 2020), Technical Specification, 3rd Generation Partnership Project; Technical Specification Group Radio Access Network; NR; Medium Access Control (MAC) protocol specification (Release 16), 154 pages.
3GPP TS 38.214, V16.1.0, (Mar. 2020), Technical Specification, 3rd Generation Partnership Project; Technical Specification Group Radio Access Network; NR; Physical layer procedures for data (Release 16), 151 pages.
Chinese Notification to Complete Formalities of Registration issued in CN Patent Application No. 2022108263550, dated Aug. 3, 2023, 8 pages. English translation included.
Qualcomm Incorporated, "Cross-slot scheduling power saving techniques," 3GPP TSG-RAN WG1 #97, R1-1907295, Reno, USA, May 13-17, 2019, 16 pages.
United States Notice of Allowance issued in U.S. Appl. No. 17/842,426, dated Feb. 13, 2024, 12 pages.
Chinese office action issued in CN Patent Application No. 201980101806.0, dated Mar. 14, 2024, 39 pages. English translation included.
Chinese Notification to Complete Formalities of Registration issued in CN Patent Application No. 201980101806.0, dated Jul. 22, 2024, 6 pages. English translation included.
Ericsson et al., "Periodic CSI and SRS at DRX state change," 3GPP TSG-RAN WG2 #78, Tdoc R2-122668, Prague, Czech Republic, May 21-25, 2012, 10 pages.
Japanese notice of allowance issued in JP Patent Application No. 2023-105879, dated May 14, 2024, 4 pages. English translation included.
Interdigital, Inc., "On Cross-slot Scheduling for UE Power Saving," 3GPP TSG RAN WG1 #98bis, R1-1910912, Chongqing, China, Oct. 14-20, 2019, 4 pages.
Huawei et al., "Procedure of cross-slot scheduling for UE power saving," 3GPP TSG RAN WG1 Meeting #98, R1-1908070, Prague, Czech Republic, Aug. 26-30, 2019, 12 pages.
Interdigital, Inc., "On Cross-slot Scheduling for UE Power Saving," 3GPP TSG RAN WG1 #99, R1-1912737, Reno, USA, Nov. 18-22, 2019, 4 pages.
Samsung, "Procedure of cross-slot scheduling power saving techniques," 3GPP TSG RAN WG1 #99, R1-1912487, Reno, USA, Nov. 18-22, 2019, 10 pages.

* cited by examiner

POWER SAVING TECHNIQUES

CROSS-REFERENCE TO RELATED APPLICATIONS

This application is a continuation of International Patent Application No. PCT/CN2019/116583, filed on Nov. 8, 2019, the contents of which are incorporated herein by reference in their entirety.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

The techniques disclosed in this patent document can enable a user equipment (UE) to save power consumption and/or can enable the UE to acquire the channel state in time without reducing the UE's data transmission efficiency.

In an example embodiment, a wireless communication method comprises determining, by the communication device, an operating mode based on a first signaling, and operating the communication device in the operating mode, where the operating mode includes any one of a normal mode, a first power saving mode, a second power saving mode, a third power saving mode, and a fourth power saving mode.

In some embodiments, the determining is made based on any one or more of (1) a reception of the first signaling, (2) an information field in the first signaling, or (3) information indicated by a second preset parameter received by the communication device. In some embodiments, the communication device determines to operate in the normal mode upon detecting the reception of the first signaling, the first signaling includes an uplink or a downlink data transmission indication, and the communication device determines to operate in the second power saving mode upon detecting an absence of the first signaling. In some embodiments, the operating mode includes the normal mode in which the communication device monitors a downlink control channel according to a period and an offset.

In some embodiments, the operating mode includes the first power saving mode in which the communication device does not monitor a downlink control channel scrambled by at least some radio network temporary identifier. In some embodiments, the operating mode includes the second power saving mode in which the communication device does not monitor a downlink control channel.

In some embodiments, the operating mode includes the third power saving mode in which the communication device monitors a downlink control channel according to a preset monitoring configuration for the downlink control channel. In some embodiments, the preset monitoring configuration for the downlink control channel includes at least one of a monitoring periodicity for the downlink control channel, a monitoring offset for the downlink control channel, or a number of consecutive slots that a search space lasts in every occasion.

In some embodiments, the operating mode includes the fourth power saving mode in which the communication device is configured to not transmit or detect a downlink control information (DCI) that indicates a parameter K0 that is less than the minimum value for the parameter K0, and not transmit or detect a DCI that indicates a parameter K2 that is less than the minimum value for the parameter K2, and does not transmit or detect a DCI that indicates channel state information (CSI) triggering state in which channel state information (CSI)-reference signal (RS) triggering offset is less than the minimum value for the parameter K0. In some embodiments, the first signaling includes any one of a wake-up indication information, minimum threshold indication information for parameter K0 and parameter K2, an uplink or downlink data transmission indication, a bandwidth part (BWP) identifier (ID), a secondary cell (SCell) dormancy behavior indication, a SCell non-dormancy behavior indication, and a maximum multiple-input multiple-output (MIMO) layer indication information.

In some embodiments, the wake-up indication information includes one or more bits, and where a trigger state indicated by the wake-up indication information is configured by a high-layer signaling.

In some embodiments, the communication device determines that the operating mode is the fourth power saving mode in response to determining that a minimum threshold indication information for the parameter K0 and the parameter K2 is greater than zero.

In some embodiments, the operating mode includes the fourth power saving mode, and where the communication device operating in the fourth power saving mode is configured not to monitor a downlink control channel in response to determining that a remaining time of a drx-onDurationTimer or a drx-InactivityTimer or a bandwidth part (BWP) inactivity timer or a SCellDeactivationTimer is less than M slots or milliseconds, where M is a positive integer of greater than zero or less than or equal to 10.

In some embodiments, the operating mode includes the fourth power saving mode, and where the communication device operating in the fourth power saving mode is configured to decode a downlink control channel within one-slot in response to determining that a remaining time of a drx-onDurationTimer or a drx-InactivityTimer or a bandwidth part (BWP) inactivity timer or a SCellDeactivationTimer is less than M slots or milliseconds, where M is a positive integer of greater than zero or less than or equal to 10.

In some embodiments, the communication device determines to operate in the operating mode based on information indicated by the first signaling and the second preset parameter, and the second preset parameter includes any one of a bandwidth part (BWP) identifier (ID), a search space, a downlink control information (DCI) format, a radio network temporary identifier (RNTI), a higher layer signaling, or a timer.

In some embodiments, the second preset parameter is BWP ID, where either the first signaling is received and includes a do not wake-up indication information, or the first signaling is not detected, and where the communication device operates in the second power saving mode upon determining that an active BWP is an initial BWP or a default BWP or a first BWP of a primary cell (PCell). In some embodiments, the second preset parameter is BWP ID, where either the first signaling is received and includes a do not wake-up indication information, or the first signaling is not detected, and where the communication device operates in the first power saving mode upon determining that an active BWP is not an initial BWP or a default BWP or a first BWP of a primary cell (PCell).

In some embodiments, the second preset parameter is a timer, where the communication device, upon determining that the timer has expired, operate in the first power saving mode. In some embodiments, the first signaling is received from a primary cell (PCell) and/or a primary secondary cell (PSCell), where the operating mode is configured to operate on PCell and/or the PSCell. In some embodiments, the downlink control channel is a physical downlink control channel (PDCCH). In some embodiments, the DCI is scrambled by at least one of cell radio network temporary (C-RNTI), configured scheduling RNTI (CS-RNTI) or modulation coding scheme RNTI (MCS-RNTI)

In yet another exemplary aspect, the above-described methods are embodied in the form of processor-executable code and stored in a non-transitory computer-readable storage medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Figure 1:
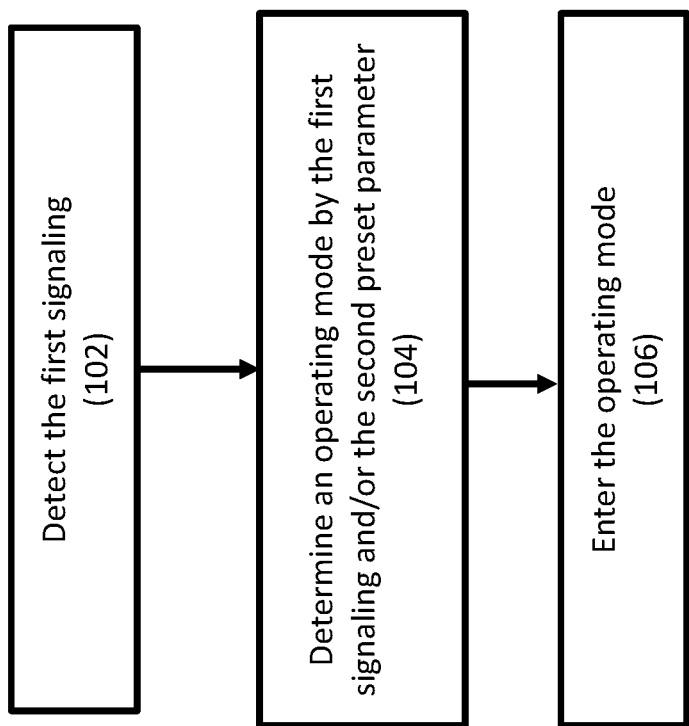
FIG. 1 shows an exemplary flowchart to enable a user equipment (UE) to determine an operating mode.

With the development of wireless communication technologies, performance factors such as transmission rate, delay, throughput, and reliability of wireless communication systems have been greatly improved through technologies such as high frequency band, large bandwidth, and multiple antennas. On the other hand, in order to achieve high-performance wireless transmission, the user equipment (UE) is expected to perform relatively complex processing to meet performance requirements, for example, detecting a large control channel bandwidth, more complicated control information, data information encoding, decoding processing, etc., and the power consumption of the UE can affect the user experience. Therefore, the power saving of the UE is a problem that the wireless communication system should solve. In the development of wireless communication technology, how to save UE power consumption and achieve the balance of system performance and UE power under the premise of meeting certain performance indicators is a problem to be solved.

In current technology, discontinuous reception (DRX) can be used for UE power saving. The basic mechanism of the DRX is to configure a DRX cycle for the UE. The DRX cycle consists of DRX On duration and DRX off. During "DRX On duration," the UE in an active state monitors and receives the physical downlink control channel (PDCCH); at "DRX off," the does not monitor most of PDCCH to reduce power consumption. The UE in DRX off indicates that most of PDCCH is not received. The UE in DRX off may receive data from other physical channels, such as physical downlink shared channel (PDSCH), acknowledgement/non-acknowledgement (ACK/NACK), and the like. Further, the base station may send a signaling to further reduce power consumption. In the DRX off, the UE does not monitor the most of PDCCH and does not perform CSI report or the like. This method affects the timely acquisition of channel state of the UE, resulting in the retransmission of which data transmission errors, thus reducing the efficiency of the UE data transmission and may increase the power consumption of the UE. To overcome at least the technical problems mentioned above, the exemplary techniques described in this patent document can save the UE energy consumption and/or can enable the UE to acquire the channel state in time without reducing the UE's data transmission efficiency.

This patent documents describes at least four exemplary methods for a UE to determine an operating mode. In a first example method, the UE enters a normal mode upon receiving a first signaling, or the UE enters a power saving mode upon determining an absence of a reception of the first signaling. In a second example method, the UE enters normal mode upon determining that a field information in a received first signaling indicates that the UE should enter normal mode, or the UE enters power saving mode upon determining that a field information in a received first signaling indicates that the UE should enter power saving mode.

In a third example method, the UE enters one of the operating modes upon receiving a first signaling, or the UE enters another power saving mode if the UE does not receive the first signaling and satisfies a bandwidth part identifier (BWP ID) condition, or the UE enters yet another power saving mode if the UE does not receive the first signaling and does not satisfy the BWP ID condition. In a fourth example method, the UE enters normal mode upon determining that a field information in a received first signaling indicates that the UE should enter normal mode, or the UE enters one of the power saving modes upon determining that a field information in a received first signaling indicates to enter a power saving mode and the UE determines that a BWP ID condition is satisfied, or the UE enters another power saving mode upon receiving a first signaling and determining that a field information in the first signaling indicates the another power saving mode and the UE determines that the BWP ID condition is not satisfied.

The example headings for the various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only, and may be used in wireless systems that implemented other protocols.

I. Brief Introduction

Generally, a UE monitors the PDCCH with a certain configuration period. The periodic and offsets of the PDCCH monitoring is configured by the high-level parameter monitoringSlotPeriodicityAndOffset. Since PDCCH monitoring consumes too many power resources of the UE, an exemplary power saving method can include adding a first signaling to indicate whether to monitor PDCCH and whether to enter a power saving mode. The first signaling can be implemented in several ways as further described below.

In a first example, the first signaling can be implemented as a wake-up signal. If first signaling is detected, the UE can wake up and monitor the PDCCH at PDCCH monitoring occasion in next or current DRX On duration. In this first example, if first signaling is not detected, the UE may not monitor PDCCH at PDCCH monitoring occasion so that the UE does not wake-up or go to a power saving mode. In a second example, the first signaling can be implemented as a sleep signal (or GTS: Go-to-sleep). In this second example, if a first signaling is detected, the UE may not monitor PDCCH at PDCCH monitoring occasion so that the UE does not wake-up or goes to a power saving mode. In this second example, if the first signaling signal is not detected, the UE can monitor PDCCH (wake-up) at PDCCH monitoring occasion in next or current DRX On duration. In a third example, the first signaling can be implemented as an indication signal. In the third example, a field in the first signaling signal indicates whether to monitor PDCCH at PDCCH monitoring occasion in next or current DRX On duration. In the third example, if the field is one bit and the UE detects that the field of the indication signal indicate, for example, a value '1', then the UE can be in wake-up (or normal) mode and can monitor PDCCH in the wake-up mode at PDCCH monitoring occasion in next or current DRX On duration, and if the field of the wake-up indication signal indicate, for example, a value '0', then the UE can determine such information to be a do not wake-up indication information and can be in the power-saving mode and the PDCCH is not monitored at PDCCH monitoring occasion in next or current DRX On duration, and vice versa.

In some embodiments, a first signaling and a second preset parameter are used to indicate whether to monitor PDCCH and whether to enter a power saving mode or a normal mode. In some embodiments, the power saving mode is power saving mode 2.

In the above proposed examples to save power based on a first signaling, if the UE does not detect a first signaling or the first signaling indicates to the UE to go to a power saving mode, the UE may enter a power saving mode (or power saving state), where a power saving mode may be a power saving mode 1 or a power saving mode 2 or a power saving mode 3 or a power saving mode 4.

In normal mode, UE monitor PDCCH at every PDCCH monitoring occasion and perform CSI report, etc., in power saving mode 1, UE does not monitor most of PDCCH. In some embodiments, in power saving mode 1, the UE does not perform channel measurement. In power saving mode 2, the UE does not monitor the PDCCH, but performs channel measurement, reference signal (RS) transmission, channel state information (CSI) reporting. In further embodiments, in power saving mode 2, the UE may also perform radio resource management (RRM), etc.

In power saving mode 3, UE can monitor one or more PDCCHs. In some embodiments, in power saving mode 3, the number of the PDCCH monitored is less than the number of PDCCH monitored in normal mode. In power saving mode 4, UE still monitor PDCCH at every PDCCH monitoring occasion, but UE is not expected to receive a scheduling DCI indicate a K0 less than minimum value of K0 or a K2 less than minimum value of K2 via PDCCH. K0 may include an offset between DCI and its scheduled PDSCH. K2 may include a slot offset between DCI and its scheduled PUSCH.

In some embodiments, in an operating mode, a UE can perform the CSI measurement/reporting or SRS transmission during an Active Window. In some embodiments, in power saving mode 2, a UE can perform the CSI measurement/reporting or SRS transmission during an Active Window. In some embodiments, in one of the following modes: power saving mode 1, power saving mode 2, power saving mode 3, a UE can perform the CSI measurement/reporting or SRS transmission during an Active Window. In an example, the location of the Active Window could be defined by a starting position. In this example, the length of the Active Window is predefined or configured by higher layer parameter. In another example, the location of the Active Window is determined by a starting position and length. In another example, the location of the Active Window is at least determined by a periodicity and/or offset.

If a first signaling indicates the UE to enter a power saving mode and the currently activate bandwidth part (BWP) or the BWP indicated by the BWP ID is initial BWP, default BWP or a first BWP of primary cell (PCell), the UE enters the power saving mode 2. Otherwise, if a first signaling indicates the UE to enter the power saving mode and the currently activate BWP or the BWP indicated by the BWP ID is not the Initial BWP, default BWP or a first BWP of PCell, then the UE enters power saving mode 1. In an example implementation a WUS may not have an indication of the BWP ID so that the BWP is the current active BWP. If WUS has a BWP ID indication, the BWP is the BWP indicated by the BWP ID.

II. Implementation Example 1

FIG. 1 shows an exemplary flowchart to enable a user equipment (UE) to determine an operating mode. At the detecting operation 102, the UE monitors the first signaling (or first pre-defined signaling), where the first signaling can indicate to the UE to enter a power saving mode or a normal mode. At the detecting operation 102, the UE receives the first signaling from a base station. At the determining operation 104, the UE determines an operating mode according to a first signaling and/or a second preset parameter. At operation 106, UE enters the operating mode. In some embodiments, the UE may detect an absence of a first signaling so that the UE may determine what mode to operate in based on a determination that the first signaling is not received.

In some embodiments, the operating mode can be determined based on the UE whether receiving a first signaling. In some embodiments, the operating mode can be determined based on the indication field value in a first signaling received by UE. In some embodiments, the operating mode can be determined based on the UE receiving the first signaling and a second preset parameter. In such embodiments, at the determining operation 104, the UE determines which of the plurality of power saving modes or normal mode to enter upon a first signaling and a second preset parameter. The power saving modes may include a power saving mode 1 or a power saving mode 2 or a power saving mode 3 or a power saving mode 4.

The first signaling includes at least one of the following: wake-up indication information, indication of minimum values for parameters K0 and K2, data scheduling information (or a scheduling grant), BWP ID, SCell dormancy/non-dormancy behavior indication information, maximum MIMO layer indication information, high-layer configuration parameter, and/or the like. The second preset parameter include at least one of the following: BWP ID, Search Space, DCI format, radio network temporary identifier (RNTI), high-level configuration information. In some embodiments, the first signaling is sent by a base station on a PCell, indicating an operating mode at least for the PCell.

In normal mode, the UE monitor PDCCH according to the first preset PDCCH monitoring configuration. In power saving mode 1 (or sleep state), UE disable monitor some radio network temporary identifier scrambled PDCCH. In some embodiments, UE does not monitor physical downlink control channel (PDCCH) scrambled by cell radio network temporary identifier (C-RNTI), configured scheduling RNTI (CS-RNTI), interruption RNTI (INT-RNTI), slot format indication RNTI (SFI-RNTI), semi-persistent channel state information RNTI (SP-CSI-RNTI), transmit power control-physical uplink control channel RNTI (TPC-PUCCH-RNTI), transmit power control-physical uplink shared channel RNTI (TPC-PUSCH-RNTI), and/or transmit power control sounding reference symbols RNTI (TPC-SRS-RNTI), and the UE does not perform CSI report. In some embodiments, in power saving mode 1, UE can receive PDSCH. In some embodiments, the difference between normal mode and power saving mode 3 may be that the number or duration of PDCCH to be monitored in normal mode is greater than that of the power saving mode 3, or the periodic of PDCCH monitoring occasion of normal mode is less than that of the power saving mode 3.

In power saving mode 2 (or dormancy state), UE disable monitor PDCCH. In some embodiments, in power saving mode 2, UE disable monitor PDCCH but perform channel measurement (or CSI measurement), RS transmission, CSI reporting, and/or beam management. In some embodiments, in power saving mode 2, UE can at least monitor PDCCH scrambled by PS-RNTI and perform channel measurement, CSI reporting. In some embodiments, in power saving mode 2, UE can do CSI report in DRX off.

In power saving mode 3 (or semi-power saving state), UE monitor PDCCH according to a second preset PDCCH monitoring configuration. A PDCCH monitoring configuration include at least one of: PDCCH monitoring periodicity, PDCCH monitoring offset, or Number of consecutive slots that a SearchSpace lasts in every occasion. In some embodiments, the second preset PDCCH monitoring configuration include a PDCCH monitoring periodicity. In further embodiments, the PDCCH monitoring periodicity is greater than M slots, M is an integer. In an example, M is greater than or equal to 4. In further embodiments, the periodicity in the second preset PDCCH monitoring configuration is larger than the periodicity in the first preset PDCCH monitoring configuration. In some embodiments, the second preset PDCCH monitoring configuration include a number of consecutive slots that a SearchSpace lasts in every occasion. In further embodiments, the number of consecutive slots is less than M2 slots, M2 is a positive integer. In an example, M2 is less than 4. In further embodiments, the number of consecutive slots that a SearchSpace lasts in every occasion in the second preset PDCCH monitoring configuration is less than the number of consecutive slots that a SearchSpace lasts in every occasion in the first preset PDCCH monitoring configuration. In some embodiments, UE may skip some slots of PDCCH which may need to be monitored. In some embodiments, UE may skip PDCCH for a period. In some example, the period is in a unit of slot, or millisecond.

In power saving mode 4 (or cross-slot scheduling state), a communication node does not expect to transmit or detect a DCI scrambled by cell radio network temporary (C-RNTI), configured scheduling RNTI (CS-RNTI) or modulation coding scheme (MCS-RNTI) which indicates a K0 less than the minimum value of the K0, does not expect to transmit or detect a DCI scrambled by C-RNTI, CS-RNTI or MCS-RNTI which indicates a K2 less than the minimum value of the K2, does not expect to transmit or detect a DCI which indicates CSI triggering state in which CSI-RS triggering offset is less than the minimum value of the K0. In some embodiments, in power saving mode 4, UE may disable buffering of data received via a downlink shared channel. In some embodiments, in power saving mode 4, UE may relax or increase processing time for information received via the physical downlink control channel and may cannot finish PDCCH decoding in one slot. In power saving mode 4 (or cross-slot scheduling state), a communication node does not expect to transmit or detect a DCI which indicates a K0 less than the minimum value of the K0, or does not expect to transmit or detect a DCI which indicates a K2 less than the minimum value of the K2. Where a DCI is scrambled by at least one of C-RNTI, CS-RNTI or MCS-RNTI. In some embodiments, in power saving mode 4, a communication node does not expected to transmit/receive a PDSCH scheduled with C-RNTI, CS-RNTI or MCS-RNTI with K0 smaller than the minimum value of K0, does not expected to transmit/receive a PUSCH scheduled with C-RNTI, CS-RNTI or MCS-RNTI with K2 smaller than the minimum value of the K2, does not expected to be triggered by CSI triggering state indicated by the CSI trigger field in DCI in which CSI-RS triggering offset is smaller than the minimum value of K0.

In some embodiments, the first signaling include a scheduling grant, if UE receive the first signaling in a power saving mode, the UE enters the normal mode after the $T_d$ time slot. In this patent document, the term "time slot" and "slot" may be used interchangeably. In some embodiments, the power saving mode is a power saving mode 1 or a power saving mode 3 or power saving mode 4. Where $T_d$ is an integer greater than or equal to zero. (e.g., $T_d=1$). In some embodiments, $T_d$ has an upper bound. In further embodiments, the upper bound is related to a BWP switch delay.

II.(a). Entering the Power Saving Mode 4 (or Cross-Slot Scheduling Mode)

If UE receive a first signaling contains a minimum threshold (or value) indication, which indicates a minimum threshold configured in the high-level configuration information. In some embodiments, the second preset parameter includes minimum threshold of K0 and K2. If the indicated minimum threshold is greater than 0, enter the power saving mode 4.

In some embodiments, the first signaling includes a BWP switch indication and the current BWP do not configured with a minimum threshold of K0 and K2 or the first signaling do not include an indication of a minimum threshold of K0 and K2. If the new BWP is configured with the minimum threshold of K0 and K2, and the minimum threshold of the first index is greater than 0, or only the minimum of the configuration is configured. The UE enters the power saving mode 4 after switching to the new BWP.

In some embodiments, the second preset parameter is high layer configuration signaling. If the high-layer configuration signaling contains the minimum threshold configuration of K0 and K2, then enter the power saving mode 4.

II.(b). First Signaling

The first signaling includes at least one of the following: wake-up indication information, K0 and K2 minimum threshold indication information, data scheduling information, BWP ID, SCell dormancy/non-dormancy behavior indication information, downlink control information (DCI), maximum MIMO layer indication information, number of PDCCH skip indication, PDCCH monitoring period indication, PDCCH skip activation/deactivation indication, CSI report indication, and/or the like.

The first signaling is at least one of the following: power saving indication signaling, higher layer signaling (for example: RRC signaling, MAC CE signaling), layer 1 signaling.

In some embodiments, first signaling is high-layer signaling, e.g. RRC signaling, MAC CE signaling. In some embodiments, the first signaling is layer 1 signaling, for example, DCI, power saving signaling. In some embodiments, the first signaling is received during the active time (DRX On) and/or inactive time (DRX off). In some embodiments, the first signaling is a wake-up signal (WUS).

In some embodiments, the first signaling includes wake-up indication information. The first signaling includes an information bit field indicating the wake-up information of one or more UEs. The number of bits indicating the operating mode of one UE in the first signaling is referred to as "$N_{WUS}$" bits, where $N_{WUS}$ is a positive integer greater than or equal to 1 and less than or equal to 3.

In some embodiments, $N_{WUS}$ is equal to 1, with one state of its bit value indicating normal mode and the other state of its bit value indicating a power saving mode. For example, '0' means to go to a power-saving mode, and '1' means to go into a normal mode. In this example, the power-saving mode is power saving mode 2.

In some embodiments, $N_{WUS}$ is equal to 2, and different trigger states of the field indicate different operating modes. For example, trigger state '00' represents a power saving mode 1, trigger state '01' represents a power saving mode 2, and trigger states '10' and '11' represent a normal mode. In some embodiments, the operating mode mapping method is configured by higher-layer signaling (e.g., RRC).

In some embodiments, the operating mode is determined by whether receive a first signaling. If the UE receives the first signaling, the UE enters the normal mode; otherwise, if the UE does not receive (or detect) the first signaling, then the UE enters a power saving mode. In some embodiments, the power saving mode is a power saving mode 2. In some embodiments, the power saving mode is a power saving mode indicated by the higher layer configuration information.

In some embodiments, if UE detect an absent of a first signaling which include a wake-up indication field, UE goes to a power saving mode (e.g., a power saving mode 2). Otherwise, UE goes to an operating mode according to the indication of the wake-up indication field.

In some embodiments, the first signaling includes the maximum MIMO layer number indication. In some embodiments, if the maximum MIMO layer number is less than or equal to 2, the UE enters a power saving mode; otherwise, the UE enters a normal mode.

In some embodiments, the first signaling includes a minimum threshold of K0 and K2 indication. If the minimum threshold is greater than 0, UE enters power saving mode 4.

In some embodiments, first signaling includes SCell dormancy behavior activation indication and/or SCell dormancy behavior deactivation indication. A SCell is go to a power saving mode 2 for which indicated to go to a dormancy behavior, and the other SCells are go to a normal mode or another power saving mode.

In some embodiments, the first signaling includes a BWP ID. If the BWP bandwidth indicated by the BWP ID is less than or equal to $N_{BWP}$, and the $N_{BWP}$ is an integer greater than or equal to 20, and the unit is MHz, the UE enters a power saving mode, otherwise the UE enters a normal mode.

In some embodiments, the first signaling includes data scheduling information (or new DL or UL data transmission indication). If the UE detects a new UL or DL scheduling indicated by PDCCH, then the UE enters normal mode, otherwise it enters a power saving mode. In such embodiments, the power saving mode can be power saving mode 2. For example, the first signaling has its monitoring occasion (as described in Section II.(c).), so that if the UE determines that it has not received scheduling information during the monitoring occasions, the UE can go to a power saving state in the next or current DRX cycle.

In some embodiments, the first signaling is DCI, where a UE determines whether or not to enter power saving mode based on a search space of the DCI. For example, if the UE determines that the DCI is configured to monitor in UE search space (USS), then the UE enters the normal mode; otherwise, a power saving mode is entered. Search space includes Type0-PDCCH CSS (Common search space), Type0A-PDCCH CSS, Type1-PDCCH CSS, Type2-PDCCH CSS, Type3-PDCCH CSS, USS.

In some embodiments, a UE determines whether or not to enter power saving mode based on the DCI format of the DCI received in the first signaling. For example, if a UE determines that the DCI has, for example, a DCI format 0_1 or DCI format 1_1 or DCI format 0_0 or DCI format 1_0, then the UE enters the normal mode; otherwise, the UE enters a power saving mode. DCI format may include DCI format 0-0, DCI format 0-1, DCI format 1-0, DCI format1-1, DCI format 2-0, DCI format 2-1, DCI format 2-2, DCI format 2-3, DCI format 3-0.

In some embodiments, a UE determines whether or not to enter power saving mode based on whether a DCI received in the first signaling is related to RNTI. If the UE determines that the DCI is scrambled by the C-RNTI or the MCS-C-RNTI or the CS-RNTI, then the UE enters the normal mode. Otherwise, the UE enters a power saving mode. RNTI may include C-RNTI, CS-RNTI, MCS-C-RNTI, P-RNTI, SI-RNTI, INT-RNTI, TPC-PUSCH-RNTI, TPC-PUCCH-RNTI, SP-CSI-RNTI, SFI-RNTI, TC-RNTI, RA-RNTI, TPC-SRS-RNTI, PS-RNTI.

II.(c). When to Monitor the First Signaling

In some embodiments, the first signaling may be monitored by the UE when the UE is operating in the DRX On and/or DRX off. In some embodiments, the first signaling may be monitored in a dedicate search space. In some embodiments, the first signaling monitoring occasion is at slots from the first slot of DRX ON to the Nth slot of DRX ON, N is an integer greater than or equal to 1. In some embodiments, the first signaling monitoring occasion is the first slot of DRX ON.

II.(d). UE Act Time

In some embodiments, after the UE receives a first signaling, the UE can enter an operating mode after T2 units, where T2 is an integer greater than or equal to 0, the units is millisecond or slot. In some embodiments, T2 can be configured by RRC signaling. In some embodiments, T2 is different for entering different operating mode. In some embodiments, T2 is related to an offset between the first signaling and the DRX On. In some embodiments, T2 has an upper bound. In some embodiments, the upper bound is related to a BWP switch delay (e.g., T2=BWP switch delay).

II.(e). DCI Information Field of First Signaling

The first signaling can be used to convey information for one or more UE. The methods of UE interpret the information fields in the first signaling need to be specified.
1) In some embodiment, the first signaling includes at least two information fields. The first information field includes wake-up indication. The second information field includes scell dormancy indication if UE is indicated to wake up. In some example, the second information field triggers CSI reporting if UE is not indicated to wake up. In some example, the second information field are padded with zeros if UE is not indicated to wake up. In some example, the second information field can be ignored if UE is not indicated to wake up.
2) In some embodiment, the first signaling includes at least two information fields. The first information field includes wake-up indication. The second information field includes scell dormancy indication and/or triggering CSI reporting if UE is indicated to wake up. In some example, the second information field triggers CSI reporting if UE is not indicated to wake up. In some example, the second information field are padded with zeros if UE is not indicated to wake up. In some example, the second information field can be ignored if UE is not indicated to wake up.
3) In some embodiment, the first signaling includes at least two information fields. The first information field includes wake-up indication. The second information field includes scell dormancy indication and/or triggering CSI reporting.

Two methods (e.g., method-1, method-2) can be used to determine the location of the information field of a UE. In method-1, the location of the information field of a UE is configured by higher layer parameter. In method-2, the first information fields of one or more UE are located in the first part of the first signaling. The second information fields of one or more UE are located in the second part of the first signaling.

In method-2, the location of the second information field of a UE is determined by the first information field and/or first part of the first signaling, e.g., the code point of the first information field or the code point of first part of the first signaling or the order of indicating as wake-up in the first part of the first signaling or the order of indicating as not-wake-up (or a power saving mode) in the first part of the first signaling or the sum of less/more important bits than UE's first information field in the first part of the first signaling.

In some embodiment, if the method-1 is used, the configured parameters include the starting position of the information field. The starting positions of the first and second information field are separately configured. In some embodiment, if the method-1 is used, the configured parameters include the starting position and length of the information field. The starting positions/length of the first and second information field are separately configured. In some embodiment, if the method-1 is used, the configured parameters include the block index of the information field. The block indexes for the first and second information field are separately configured.

In some embodiment, if the method-2 is used, the configured parameters include the position of the information field and/or the size of the first part of the first signaling.

The position is used to locate the first information filed of UE in the first part. The location of the second information field is determined by the first formation field and/or first part of the first signaling. In some example, UE is indicated its location of the first information field. If UE is indicated as wake-up according to the first information field, the A-th block in second part is its second information field. In some example, A is the sum of the corresponding less/more significant bits in the first information field. In some example, UE is the A-th indicating as wake-up in the first part of the first signaling or the A-th indicating as not-wake-up (or a power saving mode) in the first part of the first signaling.

In some example, the size of the first information field is the number of user devices multiplexed by the first signaling. In some example, the size of the first information field is the total size of the first information.

In some embodiment, the methods to determine the location of the information field is configured by higher layer parameter or L1 signaling. For example, the L1 signaling included in the first signaling. For example, a UE is configured with a location information and/or a size of block. If the methods to determine the location of the second information field is configured/indicated as Method-1, the location/size of block is used to determine the first and second information field. If the methods to determine the location of the second information field is configured/indicated as Method-2, the location used to determine the first information field. In some example, the size of block denotes the total size of the first part. In some example, the size of block denotes the size of the second information field for a UE.

II.(f). Miss-Detection

In some embodiment, if UE is configured to wake up in the case of the first signaling is not detected or CRC check of the first signaling fails, the state or BWP of the scell does not change. In some embodiment, if UE is configured to wake up in the case of the first signaling is not detected or CRC check of the first signaling fails, the activated scells switch to active state or switch to a BWP that is configured with PDCCH occasion or switch to the normal mode. In some example, if UE does not wake up in the case of the first signaling is not detected or CRC check of the first signaling fails, the state or BWP of the scell does not change; if UE wakes up in the case of the first signaling is not detected or CRC check of the first signaling fails, the activated scells switch to active state or switch to a BWP that is configured with PDCCH occasion or switch to the normal mode.

In some embodiment, if UE is not configured to wake up in the case of the first signaling is not detected or CRC check of the first signaling fails, UE does not start the DRX On duration Timer.

In some embodiments, if a UE is configured to not wake up in the case of the first signaling is not detected or CRC check of the first signaling fails, the SCell which is in dormancy behavior transmit to non-dormancy behavior; otherwise, the SCell behavior about dormancy or non-dormancy does not change.

In some embodiments, if a UE is configured to wake up in the case of the first signaling is not detected or CRC check of the first signaling fails, the SCell which is in dormancy behavior transmit to non-dormancy behavior; otherwise, the SCell behavior about dormancy or non-dormancy does not change.

In some embodiments, if the first signaling is not detected or CRC check of the first signaling fails, the SCell behavior about dormancy or non-dormancy does not change.

In some example, if UE does not wake up in the case of the first signaling is not detected or CRC check of the first signaling fails, the SCell behavior about dormancy or non-dormancy does not change; if UE wakes up in the case of the first signaling is not detected or CRC check of the first signaling fails, the SCell which is in dormancy behavior transmit to non-dormancy behavior.

In some embodiment, if UE is configured to wake up in the case of the first signaling is not detected or CRC check of the first signaling fails, UE goes to a power saving mode 4.

In some embodiment, if the first signaling is not detected or CRC check of the first signaling fails, and a predefined condition is fulfilled, the operation in the Active Window can be the same as Section II.(h), where the predefined condition is that UE is configured to wake up in the case of the first signaling is not detected or CRC check of the first signaling fails or UE is not configured to wake up in the case of the first signaling is not detected or CRC check of the first signaling fails.

A feedback can be provided by UE to indicate whether the first signaling is detection or not. The feedback includes uplink transmission indicated by the first signaling. The uplink transmission includes the CSI reporting or acknowledgement in response to the first signaling.

II.(g). Second Preset Parameter

The second preset parameter may include at least one of the following: BWP ID, Search space, DCI format, RNTI, or high-level configuration information. In some embodiments, the second preset parameter is high-level configuration information. If a first signaling does not include a BWP ID, the BWP ID may be sent to UE as the second preset parameter using high layer configuration signaling or L1 signaling.

The higher layer configuration information includes at least one of the following: an indication of a power saving mode, a PDCCH monitoring period in a power saving mode 3, a number of slots for PDCCH skip in a power saving mode 3, a minimum threshold of K0 and K2, a power saving mode timer time.

In some embodiments, the UE receives high-level configuration information indicating a power saving mode (for example, power saving mode 2), and the UE determines whether enters normal mode or power saving mode 2 according to the first signaling.

In some embodiments, the higher layer configuration signaling includes a mapping information for DCI trigger state and the corresponding power saving mode. In some embodiments, the high-level configuration signaling is configured with multiple operating modes (for example, power saving mode 1 and power saving mode 2), and the UE determines, according to the first preset information, which operating mode to enter.

In some embodiments, if the UE does not receive high-level configuration information indicating an operating mode, the power saving mode defaults to power saving mode 2.

In some embodiments, the second preset parameter is a BWP ID. If the UE is determined to enter a power-saving mode according to the first preset parameter and the current active BWP or the BWP indicated by the BWP ID is an initial BWP or a default BWP or a first BWP of PCell, the UE goes into power saving mode 2, otherwise, the UE goes to power saving mode 1.

In some embodiments, the second preset parameter is a higher layer configuration information and a BWP ID. If the high-level configuration information is configured with the power saving mode 1 and power saving mode 3, it determines which operating mode to enter according to the currently activated BWP ID or the BWP indicated by the first signaling (different BWP IDs correspond to different power-saving mode).

II.(h). CSI Report

UE can perform the CSI measurement/reporting or SRS transmission during an Active Window. In an example, the location of the Active Window could be defined by a starting position. In this example, the length of the Active Window is predefined or configured by higher layer parameter. In another example, the location of the Active Window is determined by a starting position and length. In another example, the location of the Active Window is at least determined by a periodicity and/or offset. In an example, the location of the Active Window is determined by at least one of the following factors:
  UE capability; or,
  UE assistance information; or,
  Time domain parameter of the reference signals; or,
  CSI processing capability, where the CSI processing capability could be CSI computation time; or,
  Subcarrier-space; or,
  DRX configuration; or,
  Time domain parameter of the first signaling, where the time domain parameter could be periodicity, offset, and/or PS_offset, where the PS_offset is the offset between the occasion of the first signaling to the start of DRX on duration; or,
  the length of the Active window is no less than ambiguity period; or,
  Higher layer parameter; or,
  SFN, or subframe number.

In some example, UE can report the capability of supporting the Active Window or not. In some example, UE can report the capability of supported configuration or parameter of the Active Window.

In some example, UE can report the assistance information of preferred configuration or parameter of the Active Window.

In some example, the Active Window is at least determined by the time domain parameter of the reference signals, where the reference signals could be CSI-RS or SRS. In some example, the timer domain behavior of the CSI-RS or SRS could be periodic or semi-persistent. The time domain parameters could be periodicity and/or offset. In some In some example, the timer domain behavior of the CSI-RS or SRS could be aperiodic. The time domain parameters could be triggering offset. The triggering offset could be the offset between the first signaling and the reference signals.

In some example, the Active Window is at least determined by UE's CSI processing capability, where the CSI processing capability includes CSI computation time.

In some example, the Active Window is at least determined by the time domain parameter of CSI-RS resource and CSI processing capability.

In some example, the Active Window is at least determined by the DRX configuration. In some embodiment, the Active Time Window could be aligned with the DRX on duration. In some embodiment, the Active Time Window could be DRX on duration. In some embodiment, the Active Time Window includes at least DRX on duration. In some embodiment, the Active Time Window is within the DRX on duration. In some embodiment, the length of Active Window is the same or no larger than the drx-onDurationTimer.

In some embodiment, the Active Window is determined by at least one of the following parameters: SFN, subframe number, DRX cycle, drx-StartOffset, or drx-SlotOffset.

In some embodiment, the Active Window is started after drx-SlotOffset from the beginning of the subframe if [(SFN×10)+subframe number] modulo (drx Cycle)=drx-StartOffset.

Wherein the drx-StartOffset or drx-StartOffset is included in DRX configuration.

In some embodiment, the Active Window is determined by at least one of the following parameters: SFN, subframe number, drx cycle, or drx-StartOffset, where the drx cycle could be drx-short cycle or drx-long cycle.

In some embodiment, the Active Window is started from the beginning of the subframe if [(SFN×10)+subframe number] modulo (drx Cycle)=drx-StartOffset, where the drx cycle could be drx-short cycle or drx-long cycle.

In some embodiment, the Active Window is at least determined by time domain parameter of the first signaling. In some embodiment, the Active Window starts after PS_offset of the first signaling.

In some embodiment, the Active Window is at least determined by time domain parameter of the first signaling, and the DRX configuration. In some embodiment, the Active Window starts after PS_offset of the first signaling. The length of the Active Window is the same or no less than the drx-onDurationTimer.

In some embodiment, the length Active Window is no less than an ambiguity period. In in current symbol n, if the MAC entity would not be in Active Time considering grants/assignments/DRX Command MAC CE/Long DRX Command MAC CE received and Scheduling Request sent until ambiguity period prior to symbol n when evaluating all DRX Active Time conditions, UE would not transmit periodic SRS or semi-persistent SRS or report CSI on PUCCH or semi-persistent CSI on PUSCH. The ambiguity period could be 4 ms.

In some embodiment, there are N1 CSI reference resources during the Active Window. In some example, the CSI reference resource include CSI-RS or SSB. In some embodiment, there are N2 CSI reporting occasions during the Active Window. In some embodiment, there are N3 SRS transmission occasions during the Active Window. where N1,N2,N3 are natural numbers. In some example, N1, and N2 are the same.

In some embodiment, UE is expected to perform measurement based on all or a first subset of the N1 CSI reference resources during the Active Window. In some embodiment, if the first predefined condition is fulfilled, UE is expected to perform measurement based on all or a first subset of the N1 CSI reference resources during the Active Window.

In some embodiment, the first predefined condition includes at least one of the following:
(1) UE is indicated as not-wake-up for one or multiple DRX cycle. In some example, the multiple DRX cycles are consecutive.
(2) UE is indicated as not-wake-up before one or multiple DRX on duration. In some example, the multiple DRX On duration are consecutive.
(3) The first signaling is not detected by UE during a period. In some example, the period includes one or multiple DRX cycles. In some example, the period includes one or multiple DRX on duration. In some example, the multiple DRX cycles or DRX On duration are consecutive.

In some embodiment, UE does not starts drx-onDurationTimer if UE is indicated with not-wake-up. In some embodiment, UE does not PDCCH scrambled by a predefined RNTI if UE is indicated with not-wake-up. Wherein the predefined RNTI includes P-RNTI, SI-RNTI, RA-RNTI, TC-RNTI, or PS (power saving)-RNTI.

In some example, the first subset of the N1 CSI reference resources is determined by an indication from network. The indication could be in a form of bitmap. In some example, the number of CSI measurement included in first subset is indicated by network, and which reference resources are used for CSI measurement is determined by UE. In some example, the first subset of the N1 CSI reference resources is determined by the time domain configuration. The time domain configuration includes the position relative to other reference signals or signaling or the start of timer. Wherein the reference signals include SSB. Wherein the signaling include the first signaling. Wherein the start of timer include the start of drx-onDurationTimer.

In some embodiment, UE is expected to perform all or a first subset of the N2 CSI reporting during the Active Window. In some embodiment, if the third predefined condition is fulfilled, UE is expected to perform measurement based on all or a second subset of the N2 CSI reporting during the Active Window.

In some embodiment, the third predefined condition includes at least one of the following:
(1) UE is indicated as not-wake-up for one or multiple DRX cycle. In some example, the multiple DRX cycles are consecutive.
(2) UE is indicated as not-wake-up before one or multiple DRX on duration. In some example, the multiple DRX On duration are consecutive.
(3) The first signaling is not detected by UE during a period. In some example, the period includes one or multiple DRX cycles. In some example, the period includes one or multiple DRX on duration. In some example, the multiple DRX cycles or DRX On duration are consecutive.

In some example, the second subset of the N2 CSI reporting is determined by an indication from network. The indication could be in a form of bitmap. In some example, the number of CSI reporting occasions included in second subset is indicated by network, and the occasions of CSI reporting are determined by UE. In some example, the second subset of the N2 CSI reporting is determined by the time domain configuration. The time domain configuration includes the position relative to other reference signals or signaling or the start of timer. Wherein the reference signals include SSB. Wherein the signaling include the first signaling. Wherein the start of timer includes the start of drx-onDurationTimer.

In some embodiment, UE is expected to perform all or a first subset of the N3 SRS transmission during the Active Window. In some embodiment, if the fourth predefined condition is fulfilled, UE is expected to perform measurement based on all or a third subset of the N3 SRS transmission during the Active Window.

In some embodiment, the fourth predefined condition includes at least one of the following:
  (1) UE is indicated as not-wake-up for one or multiple DRX cycle. In some example, the multiple DRX cycles are consecutive.
  (2) UE is indicated as not-wake-up before one or multiple DRX on duration. In some example, the multiple DRX On duration are consecutive.
  (3) The first signaling is not detected by UE during a period. In some example, the period includes one or multiple DRX cycles. In some example, the period includes one or multiple DRX on duration. In some example, the multiple DRX cycles or DRX On duration are consecutive.

In some example, the third subset of the N3 SRS transmission is determined by an indication from network. The indication could be in a form of bitmap. In some example, the number of SRS transmission occasions included in the third subset is indicated by network, and the occasions of SRS transmission are determined by UE. In some example, the third subset of the N3 SRS transmission is determined by the time domain configuration. The time domain configuration includes the position relative to other reference signals or signaling or the start of timer. Wherein the reference signals include SSB. Wherein the signaling include the first signaling. Wherein the start of timer includes the start of drx-onDurationTimer.

In some embodiment, the reference resource for CSI measurement/reporting or SRS transmission is restricted. In some example, the restriction could be at least one of the following:
  (1) the number of ports. For example, the resource is single port CSI-RS; or,
  (2) The time/frequency resource allocation of the reference resource. For example, the number of symbols within a slot, the duration of the signals; or,
  (3) The comb factor.

In some embodiment, the type/parameter of CSI reporting is restricted. In some example, the restriction could be at least one of the following:
  (1) The CodebookType is set to 'type1-SinglePanel';
  (2) Only sub-band or wide-band CSI is required to be reported;
  (3) Only type-I CSI is required to be reported; or
  (4) The CSI is reported via PUCCH; or
  (5) The rank or layer of CSI reporting is restricted.
  (6) II.(i). indication of first signaling In the below description, the first signaling (or PDCCH-based signal/channel) is denoted as PoSS. In some embodiment, the wake-up indication of PoSS triggers UE to or not to monitor PDCCH in the next DRX On duration(s). In some embodiment, the wake-up indication triggers UE to or not to start the drx-onDurationTimer in the next long DRX cycle(s). In some embodiment, the dormancy behavior transitioning indication of PoSS triggers UE to perform dormancy-like behavior on the activated Scell(s). In some embodiment, the dormancy behavior transitioning indication of PoSS triggers UE to perform non dormancy-like behavior on the activated Scell(s). In some embodiment, the bit width of dormancy behavior transitioning indication of PoSS is not smaller than that of the wake-up indication of the PoSS. In some embodiment, the bit width of the other power saving functions indicated by PoSS triggering the UE to wake-up is larger than that of the PoSS triggering the UE not to wake-up.

In some embodiment, a bit field can indicate one triggering state for different UEs. In some embodiment, the wake-up indication field of the PoSS for one or more UEs only indicates one wake-up triggering state. For some examples, each bit of the wake-up information field in PDCCH-based signal/channel can only indicate '1'. In some embodiment, if the bit field of wake-up indication corresponding to non available or valid UE, the bit field is set to '0'.

In some embodiment, PDCCH-based signal/channel can indicates more than one functions that at least includes wake-up information and dormancy behavior transitioning on the activated Scells. In some embodiment, the bitwidth of dormancy behavior transitioning function is equal to 0 if the bit value of wake-up indication for the UE is equal to '0'.

In some embodiment, the bitwidth of wake-up indication field is N, and the length of the dormancy behavior transitioning indication is M which is equal to the number of groups of configured Scells by high-layer parameter. Wherein N is an integer that equal to 1. Wherein M is an integer that not smaller than 0. In some embodiment, the location information for dormancy behavior transitioning is determined by the location information for wake-up indication and the number of groups of configured S cells by high-layer parameter. In some embodiment, the location information for dormancy behavior transitioning is only determined by the location information for wake-up indication.

For example, the i-th bit of the wake-up indication field in PoSS is the location of wake-up indication from the UE. The first left bit of dormancy behavior transitioning for the UE is the (N+(i−1)*M+1)-th bit of the PoSS.

For another example, the wake-up indication of the UE is the j-th indication with a value of '1' among the N-bit wake-up indication field. The first left bit of dormancy behavior transitioning for the UE is the (N+(j−1)*M+1)-th bit of the PoSS.

In some embodiment, the PoSS has Q code blocks to trigger Q UEs. Wherein each code block has same bitwidth. In some embodiment, for the same UE, the location of wake-up indication is n and the first-bit location of dormancy behavior transitioning is n+1.

In some embodiment, the location of the wake-up indication is equal to that of the dormancy behavior transitioning function for the UE.

In some embodiment, if the bit width of the dormancy behavior transitioning indication field for the UE is larger than the number of groups of configured Scell(s) by high-layer parameter for the UE, the last remaining bits among the bit width of the dormancy behavior transitioning indication field in the PoSS is set to '0'.

(7) In some embodiment, the most significant (left) bit of the dormancy behavior transitioning represents the first (smallest) Scell group ID among the groups of the configured Scells by high-layer parameter, and the second most significant (left) bit of the dormancy behavior transitioning represents the second Scell group ID among the groups of the configured Scells by high-layer parameter.

III. Implementation Example 2

The UE receives a first signaling and determines an operating mode according to the first signaling and/or the second preset parameter. Then, the UE enters an operating mode. The operating mode may include at least one of the following: a normal mode, power saving mode 1, power saving mode 2, power saving mode 3, or power saving mode4.

The techniques described for the embodiments of implementation example 2 describe operation if the UE is in a power saving mode, how to determine the operating mode according to the first signaling and/or the second preset parameter.

The second preset parameter is a timer, data scheduling information, a high layer signaling, and/or the like.

In some embodiments, the second preset parameter is a timer (or power saving mode timer). After the UE determines that the timer is released (or expired), the UE enters another operating mode. The timer is activated right after the UE enters a power saving mode 2 or power saving mode 3 or power saving mode 4. The timer will restart if the UE receive a new DL or UL data transmission.

In some embodiments, the UE is in a power saving mode 2, after the timer is released (or expired), the UE enters power saving mode 1. In some embodiments, the UE is in a power saving mode 3, after the UE determines that the timer is released (or expired), the UE enters power saving mode 2 and reactivates (or restart) the timer. In some embodiments, the UE is in a power saving mode 3, after the UE determines that the timer is released (or expired), the UE enters power saving mode 1.

In some embodiments, a timer duration is related to at least one of the following: DRX cycle, DRX On duration time, RRC configuration, PDCCH monitoring period, frame length, high layer signaling. In some embodiments, the timer duration is related to the DRX cycle $T_{DRX}$. In some embodiments, the timer duration is $T_{DRX}*a$, where a is a number greater than 0 and less than 1.

In some embodiments, the timer duration is related to the DRX On duration time $T_{onduration}$. In some embodiments, the time duration is $T_{onduration}*b$, where b is a number greater than 0 and less than or equal to 1. In some embodiments, the time duration is $T_{onduration}-N$, where N is an integer greater than or equal to 1. In this example, N=1.

In some embodiments, timer duration is configured by RRC.

In some embodiments, the timer duration is related to the PDCCH monitoring period $T_{PDCCH\_period}$. In some embodiments, the time duration is $T_{PDCCH\_period}*C$, and c is a positive integer greater than or equal to 1 and less than or equal to 32.

In some embodiments, timer duration is related to frame length $T_F$. In some embodiments, the timer duration is $T_F*d$, where d is greater than 0. In an example, d is greater than 0 and less than 10.

In some embodiments, the second preset parameter is a data scheduling information. In some embodiments, the UE is in a power saving mode 3 or power saving mode 4, if a data scheduling DCI is received, the UE enters a normal mode (or state).

In some embodiments, the second preset parameter is a timer and data scheduling information. If the data scheduling information is not received before the timer expires, UE enters a power saving mode 1 after the timer expires, otherwise, it enters the normal mode.

In some embodiments, the second preset parameter is a higher layer signaling. In some embodiments, if the UE receives the MAC CE signaling indication to enter another operating mode, the UE enters the operating mode. In this example, the operating mode is a normal mode.

In some embodiments, UE enter an operating mode according to the first signaling indication.

III. Implementation Example 3

The UE receives a first signaling and determines an operating mode according to the first signaling and/or the second preset parameter. Then, the UE enters the operating mode. The operating mode includes at least one of the following: a normal mode, power saving mode 1, power saving mode 2, power saving mode 3, or power saving mode4.

Among them, the power saving mode 3 also includes that the UE monitors PDCCH in a small number of time slots and does not monitor PDCCH in most time slots.

In some embodiments, the first signaling includes PDCCH skip activation. After receiving the indication, the UE enters a power saving mode 3, and does not monitor the PDCCH in subsequent $N_{skip}$ time slots, where $N_{skip}$ is indicated by higher layer configuration information.

In some embodiments, the first signaling includes PDCCH skip activation, and the UE enters a power saving mode 3 after receiving the indication. UE does not monitor PDCCH in subsequent $N_{skip}$ time slots, where $N_{skip}$ is associated with DRX on-duration time $T_{onduration}$. In some embodiments, $N_{skip}=T_{onduration}-N$, where N is an integer greater than or equal to 1. In this example, N=1. In some embodiments, $N_{skip}=T_{onduration}*e$, where e is a number greater than 0 and less than 1.

In some embodiments, the first signaling includes PDCCH skip activation, and the UE enters a power saving mode 3 after receiving the indication. The PDCCH skip is that UE not to monitor the PDCCH in subsequent $N_{skip}$ slots, where $N_{skip}$ is related to the PDCCH monitoring period $T_{PDCCH\_period}$. In some embodiments, $N_{skip}=T_{PDCCH\_period}$, where f is a positive integer greater than or equal to 1.

In some embodiments, after $N_{skip}$'s time slot, the UE enters a normal mode. In some embodiments, after $N_{skip}$ time slots, UE goes into power saving mode 2.

In some embodiments, UE not receive a first signaling indicate PDCCH skip activation. UE go to power saving mode 3 after receiving the indication and not monitor PDCCH at following $N_{skip}$ slots. In some embodiments, $N_{skip}$ is configured by high-layer signaling. In some embodiments, $N_{skip}$ is associate with DRX On duration timer $T_{onduration}$. In some embodiments, $N_{skip}=T_{onduration}-1$. In some embodiments, $N_{skip}=T_{onduration}*e$, where e is greater than 0 and less than 1. In some embodiments, $N_{skip}$ is associate with PDCCH monitoring period $T_{PDCCH\_period}$. In some embodiments, $N_{skip}=T_{PDCCH\_period}*f$, where f is an integer greater than or equal to 1.

In some embodiments, the second preset parameter is higher layer configuration information, and the higher layer configuration information includes a number of slots of the PDCCH skip, $N_{skip}$, that is, the number of time slots in which the UE does not monitor the PDCCH. If the UE detects that the first signaling indicating that the awake mode is not awake (e.g., enters a power saving mode) or indicate a PDCCH skip, the UE enters a power saving mode 3, where the power saving mode 3 is that the UE does not monitor the PDCCH in subsequent $N_{skip}$ time slots.

In some embodiments, the second preset parameter is high-level configuration information, which includes a PDCCH monitoring period in a power-saving mode. If the UE detects that the first signaling indicating no wake-up (i.e., the UE enters power saving mode), the UE enters a power saving mode 3, where the power saving mode 3 is UE using the PDCCH monitoring period in the power-saving mode for PDCCH monitoring.

III. Implementation Example 4

III.(a) Exemplary Embodiment 1 of Implementation Example 4

The first signaling includes wake-up indication information, which is recorded as wake-up signaling as shown in FIG. 1.

In some embodiments, the first signaling contains an information field that indicates the mode of operation. The information field indicates the operating mode of the $N_{UE}$ UEs, where $N_{UE}$ is a positive integer greater than or equal to 1.

In some embodiments, the number of bits indicating one UE is 1, and different states of the field indicate different operating modes. For example, '0' indicates a power saving mode, and '1' indicates that the normal mode is entered.

Figure 2:
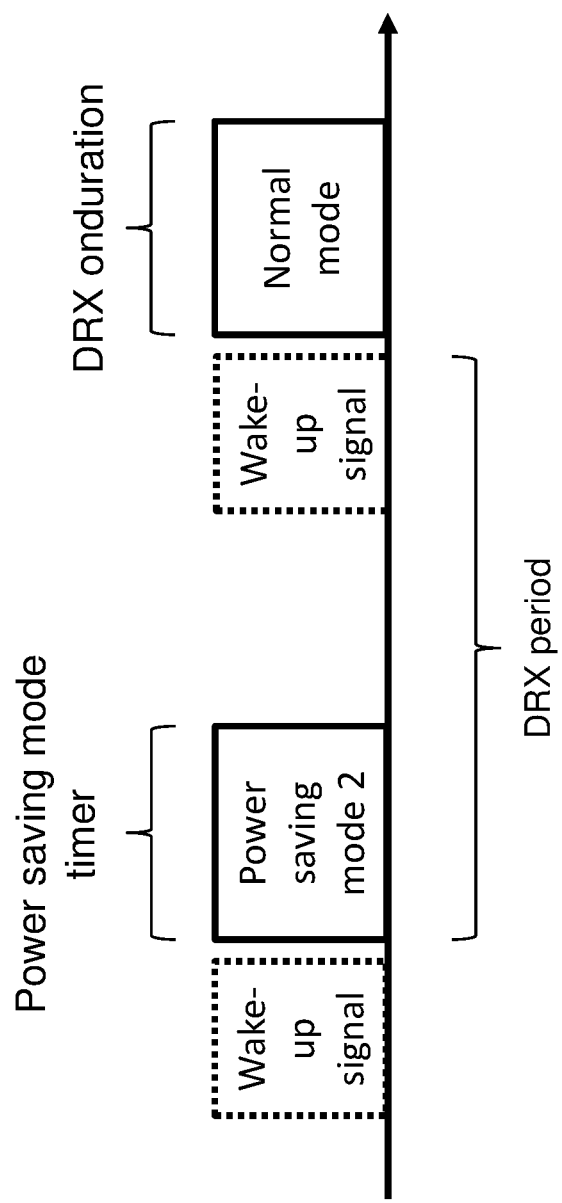
FIG. 2 determines whether the UE enters the normal mode or a second power saving mode according to a wake-up signaling indication.

FIG. 2 determines whether the UE enters the normal mode or the power saving mode 2 according to the wake-up signaling indication. As shown in FIG. 2, a UE monitor wake-up signal at a slot before every DRX On duration. If a UE receives a wake-up signal with indicate field value of '0', the UE enter power saving mode 2 for a length of time indicated by the power saving mode timer. The UE enters power saving mode 1 at the expiration of the power saving mode timer. If a UE receive a wake-up signal with indicate field value of 1', the UE enter a normal mode during next DRX On duration.

III.(a) Exemplary Embodiment 2 of Implementation Example 4

Figure 3:
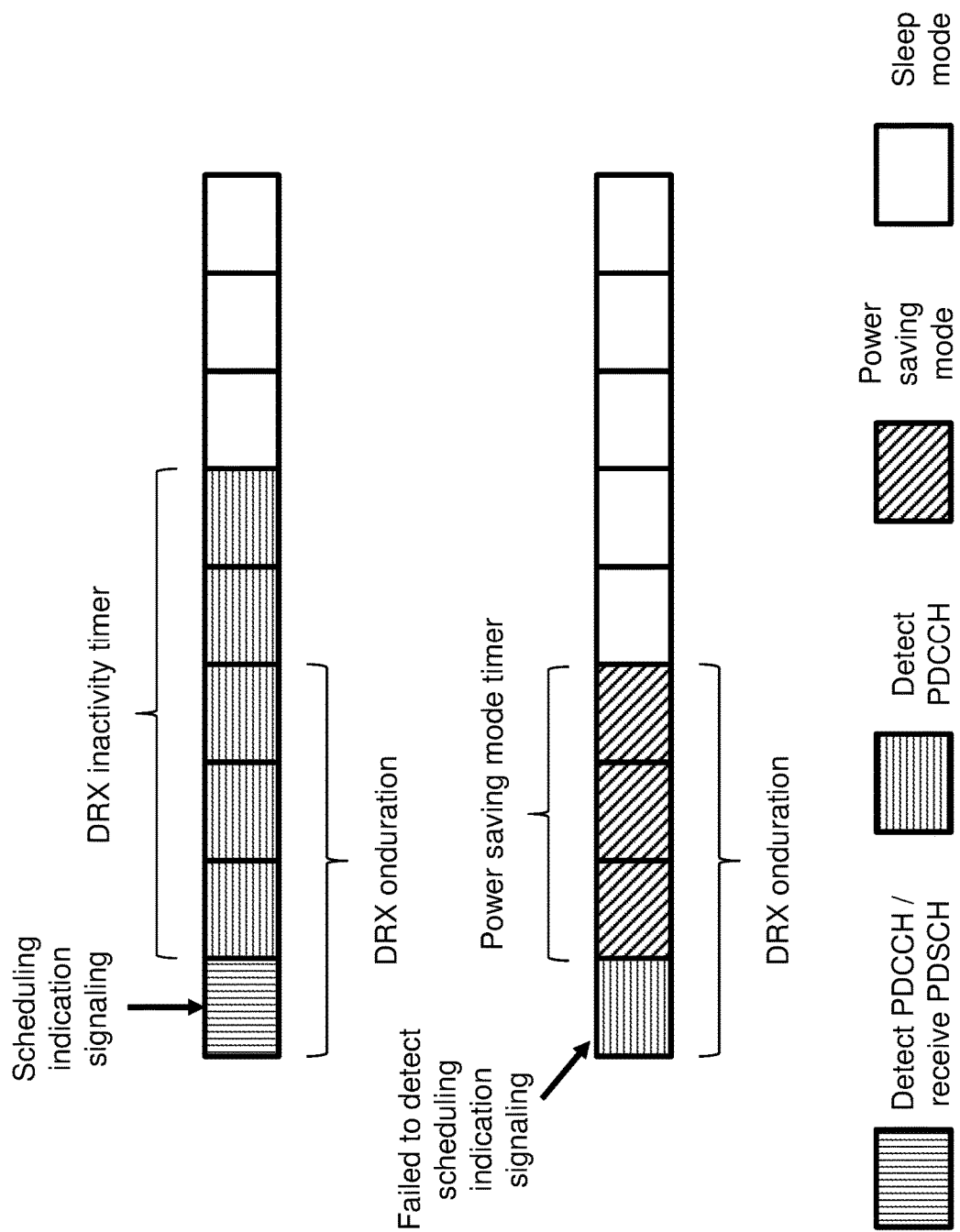
FIG. 3 shows a scheduling indication signaling that indicates whether the UE enters a power saving mode.

FIG. 3 shows a scheduling indication signaling that indicates whether the UE enters a power saving mode. The first signaling includes data scheduling information. In this embodiment, the first signaling is monitored in the first time slot of DRX ON. The first signaling is a PDCCH or DCI. If the UE detects a new data scheduling indication at the monitor occasion, the UE receives the corresponding PDSCH and restarts the DRX inactivity timer, and enters the normal mode. After the DRX inactivity timer expires, the DRX off (or power saving mode 1) is entered, if the UE does not detect a PDCCH or DCI indicating a scheduling, the UE enters the power saving mode.

In some embodiments, power saving mode is power saving mode 2 and the power saving mode timer is activated. In some embodiments, the timer length is related to the length of the DRX On duration time, which in this embodiment is $T_{onduration}-1$. When the timer expires, the UE goes to power saving mode 1 as shown in FIG. 3.

In further embodiments, the power saving mode may be power saving mode 3. If the UE does not detect the PDCCH indicating a scheduling, the PDCCH is not monitored in the subsequent $N_{skip}$ time slots, where $N_{skip}$ is indicated by the higher layer configuration information.

In further embodiments, power saving mode may be power saving mode 3, if the UE does not detect the PDCCH indicating a scheduling, then the UE adjustment PDCCH monitoring period to M time slot, M is a positive integer greater than or equal to 4, M is configured by high-level signaling.

IV. Implementation Example 5

The UE determines the operating mode of the UE according to the first signaling and/or the second preset information.

In some embodiments, the first signaling is received during an active time (DRX ON) and/or inactive time (DRX off).

In some embodiments, UE goes through T2 to the operating mode after receiving the first signaling. Where T2 is an integer greater than or equal to 0, the units is milliseconds or time slots. In some embodiments, T2 is configured by RRC signaling.

In some embodiments, the first signaling includes a BWP ID. If the indicated BWP ID is different from the previously activated BWP ID, the representative indicates a BWP switch.

If the first signaling indicates a BWP switch, in some embodiments, after switching the BWP, the UE enters a normal mode. In some embodiments, after BWP switch, the UE enters power saving mode 2.

If the first signaling indicates a BWP switch, in some embodiments, the UE enters an operation mode via T2 after receiving the first signaling, where T2 is related to the BWP switching delay $T_{BWPswitchdelay}$ (e.g., $T2=T_{BWPswitch}$).

In some embodiments, the first signaling include wake-up indication and a SCell dormancy and/or non-dormancy behavior indication. If the first signaling indicate UE enter a power saving mode. The PCell enters a power saving mode 2 and SCells enters a power saving mode 1.

In some embodiments, the first signaling include wake-up indication and a SCell dormancy and/or non-dormancy behavior indication. If the first signaling indicate UE enter a power saving mode. The PCell enters a power saving mode 2 and SCells enters a power saving mode 2 or a power saving mode 1 according to the SCell dormancy and/or non-dormancy behavior indication.

In some embodiments, the first signaling include wake-up indication and a CSI report indication. If the first signaling indicate UE enter a power saving mode. The PCell enters a power saving mode 1 and SCells enters a power saving mode 1. But UE do CSI report at the occasion indicated by CSI report indication at least in PCell.

In some embodiments, the first signaling include wake-up indication and a Cell dormancy and/or non-dormancy behavior indication. Where Cell dormancy and/or non-dormancy behavior indication include PCell and SCell indication.

In some embodiments, the first signaling indicate a power saving mode. In some embodiments, The PCell enters a power saving mode 2 and SCells enters a power saving mode 1. In some embodiments, The PCell enters a power saving mode 2 and SCells enters another operating mode. In some embodiments, The PCell enters a power saving mode 1 and SCells enters a power saving mode 1. But UE do CSI report at the occasion indicated by CSI report indication at least in PCell.

PCell may include PCell and PSCell (primary secondary cell).

V. Implementation Example 6

Implementation example 6 describes the minimum threshold for power saving mode 4. The UE determines the operating mode of the UE according to the first signaling and/or second preset parameter.

In some embodiments, the first signaling includes a minimum threshold indication for power saving mode 4, and if the minimum threshold is greater than 0, the UE enters the power saving mode 4. In some embodiments, first signaling is sent in UE inactive state (outside active time or DRX off) and/or active state (within active time or DRX On).

In some embodiments, the UE receives the first signaling sent by the base station, where the first signaling includes a minimum threshold indication. The first signaling may also be referred to as minimum threshold indication signaling. In some embodiments, the first signaling is DCI format 0_1 or DCI format 1_1. In some embodiments, the first signaling indicates a minimum threshold index of RRC signaling configuration in a 1-bit field of the DCI.

The minimum value indicated by the first signaling is act (or valid) after an application delay (or action delay or effective delay).

The UE determines the indicated minimum threshold for K0 and K2 based on the first signaling sent by the base station and the high-level configuration information.

The high-level configuration signaling is RRC configuration signaling, and the RRC configuration signaling includes zero or one or two optional minimum threshold of K0 and K2.

V.(a)

drx-onDurationTimer: the duration at the beginning of a DRX Cycle;

drx-InactivityTimer: the duration after the PDCCH occasion in which a PDCCH indicates a new UL or DL transmission for the MAC entity;

If the indicated minimum threshold for power saving mode 4 includes a value greater than zero, and the UE configured with discontinuously received (DRX: Discontinuous Reception), then In some embodiments, when the remaining time of the drx-onDurationTimer or drx-InactivityTimer is less than M (that is, the UE considers to enter a power saving mode 1 after M), where M is a positive integer equal to or less than 10 and greater than 0, and the unit is a time slot or millisecond, then the UE does not expect to receive a PDCCH during the M units. In some embodiments, M is related to an action delay (or application delay) of a minimum threshold, for example, M=application delay; in some embodiments, M is related to a PDCCH decoding time; In some embodiments, M is related to a minimum threshold of a current time slot, for example, M=k0min. where k0min is the minimum value of K0. In some embodiments, M is configured by RRC signal.

In some embodiments, when the remaining time of drx-onDurationTimer or drx-InactivityTimer is less than M (i.e., UE considers that after M will go to sleep), where M is a positive integer less than or equal to 10 and more than 0, and the unit is a time slot or millisecond, Then the UE does not relax the PDCCH decoding time (or processing timeline), that is, for example, UE can decode the PDCCH in the T1 time slot, where T1 is a positive integer greater than 0 and less than or equal to 2 (e.g., 1). In some embodiments, M is related to an action delay (or application delay) of a minimum threshold, for example, M=application delay; in some embodiments, M is related to a PDCCH decoding time; In some embodiments, M is related to a minimum threshold of a current time slot, for example, M=k0min. In some embodiments, M is configured by RRC signal.

In some embodiments, the drx-InactivityTimer starts/restarts after N units the UE receives the PDCCH indicating a new uplink or downlink transmission, where N is a positive integer greater than 0 and less than or equal to 10, and the unit is a time slot or a millisecond. In some embodiments, N is related to the action delay of the minimum threshold, for example, N=application delay; in some embodiments, N is related to the PDCCH decoding time; in some embodiments, N is related to a minimum threshold of the current time slot, for example, N=k0min. In some embodiments, N is related to k0 or k2, such as N=k0.

In some embodiments, the drx-inactivityTimer is activated/restart after the UE receives a new PDSCH or sends a PUSCH which is indicated by a DCI.

In some embodiments, the drx-inactivityTimer is restart after the UE finish decoding a DCI.

In current symbol n, if a MAC entity would not be in Active Time considering grants/assignments/DRX Command MAC CE/Long DRX Command MAC CE received and Scheduling Request sent until X ms prior to symbol n when evaluating all DRX Active Time conditions as specified, UE not transmit periodic SRS and semi-persistent SRS, UE not report CSI on PUCCH and semi-persistent CSI on PUSCH.

If CSI masking (csi-Mask) is setup by upper layers and in current symbol n, if drx-onDurationTimer would not be running considering grants/assignments/DRX Command MAC CE/Long DRX Command MAC CE received until X ms prior to symbol n when evaluating all DRX Active Time conditions, UE not report CSI on PUCCH.

X is an integer greater than 4. In some embodiments, X is associate with application delay of minimum value of K0 and K2. In some embodiments, the value of X is related to a minimum value act in the current slot, for example, X=k0min. In some embodiments, X is configured by RRC signal.

V.(b)

A BWP inactivity timer is used to switch the active BWP to the default BWP.

If the indicated minimum threshold for power saving mode 4 includes a value greater than zero, then In some embodiments, when the BWP inactivity timer is about to expire, that is, when the remaining time of the BWP inactivity timer is less than M1, the base station does not send a scheduling information to the UE. Where M1 is a positive integer less than or equal to 10 and greater than 0, and the unit is a time slot or a millisecond. In some embodiments, M1 is related to an action delay (or application delay) of a minimum threshold, for example, M1=application delay; in some embodiments, M1 is related to a PDCCH decoding time; in some embodiments, M1 is related to a minimum threshold of a current time slot configured in a scheduling cell or a scheduled cell, for example, M1=k0min. In some embodiments, M1 is configured by RRC.

In some embodiments, when the BWP inactivity timer is about to expire, i.e., when the remaining time of the BWP inactivity timer is less than M1, UE does not relax the decoding time of the PDCCH, i.e. UE can decode the PDCCH or DCI in the T2 time slot, where T2 is a positive integer (eg: 1) greater than 0 and less than or equal to 2. Where M1 is a positive integer less than or equal to 10 and more than 0, and the unit is a time slot or a millisecond. In some embodiments, M1 is related to an action delay (or application delay) of a minimum threshold, for example, M1=application delay; in some embodiments, M1 is related to a PDCCH decoding time; in some embodiments, M1 is related to a minimum threshold of a current time slot, for example, M1=k0min. In some embodiments, M1 is configured by RRC.

In some embodiments, when the BWP inactivity timer is about to expire, that is, when the BWP inactivity timer remaining time is less than M1, in this embodiment, the UE does not expect to receive a PDCCH. In some embodiments, the UE does not monitor PDCCH on the BWP. Where M1 is a positive integer less than or equal to 10 and more than 0, and the unit is a time slot or a millisecond. In some embodiments, M1 is related to an action delay (or application delay) of a minimum threshold, for example, M1=application delay; in some embodiments, M1 is related to a PDCCH decoding time; in some embodiments, M1 is related to a minimum threshold of a current time slot, for example, M1=k0min. In some embodiments, M1 is configured by RRC.

If configured cross-carrier scheduling. In some embodiment, M1 is related to a minimum threshold of a current time slot configured in a scheduling cell. In some embodiment, M1 is related to a minimum threshold of a current time slot configured in a scheduled cell. In some embodiment, M1 is related to at least one of: a maximum minimum threshold of a current time slot configured in a scheduled cell or a SCS. In one embodiment, M1=max{k0min}. In other embodiment, $$M1 = \max\left\{k0 \ \min\frac{2^{\mu_{PDSCH}}}{2^{\mu_{PDCCH}}}\right\}.$$

In other embodiments, $$M2 = \max\left\{k0 \ \min\frac{2^{\mu_{PUSCH}}}{2^{\mu_{PDCCH}}}\right\}$$

In some embodiments, BWP inactivity timer start/restart N1 units after UE receives a PDCCH indicating a new uplink or downlink transmission, where N1 is a positive integer greater than 0 or equal to 10, the units is slot or millisecond. In some embodiments, N1 is related to an action delay of the minimum threshold, e.g. N1=application delay; in some embodiments, N1 is related to the PDCCH decoding time; in some embodiments, N1 is related to the minimum threshold in the current slot, e.g. N1=k0min; in some embodiments, N1 is related to k0 or k2, for example, N=k0. In some embodiments, N1 is configured by RRC.

In some embodiments, BWP inactivity timer is start/restart after UE receives a new PDSCH or sends a PUSCH which is indicated by DCI.

In some embodiments, BWP inactivity timer is start/restart after UE decode a DCI.

In some embodiments, BWP inactivity timer is start/restart after UE finish BWP switch.

When UE receives a DCI indicating UE to switch its active BWP involving changes in any of the parameters of locationAndBandwidth and nrofSRS-Ports, the UE is allowed to cause interruption of up to X slot to other active serving cells if the UE is not capable of per-FR gap, or if the BWP switching involves SCS changing.

In some embodiments, the starting time of interruption is allowed during the time outside the BWP switching delay $T_{BWPswitchDelay}$ and before receiving a PDSCH or sending a PUSCH.

In some embodiments, the interruption is only allowed within the delay Z+Y, where Z and Y is greater than 0, the units is millisecond or slot. In some embodiments, Y is relate to a BWP switch delay (e.g., Y=BWP switch delay). In some embodiments, Z is related to a minimum value application delay. In some embodiments, Z is related to a minimum value (e.g., Z=k0min). In an example, Y=1.

When UE receives a DCI indicating UE to switch its active BWP involving changes in any of the parameters of locationAndBandwidth and nrofSRS-Ports, the UE is allowed to cause interruption of up to X+Y slot to other active serving cells if the UE is not capable of per-FR gap, or if the BWP switching involves SCS changing. Where X is greater than 0. Where Y is greater than 0 and less than 5. In some embodiments, Y is related to a minimum value, for example, Y=k0min*a1, where a1 is greater than 0. In some embodiments, a1 is related to a SCS. In some embodiments, X is related to a BWP switch delay (e.g., X=BWP switch delay).

V.(c)

Configuring sCellDeactivationTimer timer per configured SCell (except the SCell configured with PUCCH, if any): the associated SCell is deactivated upon its expiry. And in some embodiments, sCellDeactivationTimer is restart if a MAC PDU is transmitted in a configured uplink grant or received in a configured downlink assignment.

If the indicated minimum threshold for power saving mode 4 includes a value greater than zero, then In some embodiments, when the sCellDeactivationTimer is about to expire, that is, the remaining time of the sCellDeactivationTimer is less than M2, in this embodiment, the base station does not send a scheduling information of the SCell. In some embodiments, UE does not expect to receive a PDCCH of the SCell during the M2 units. In some embodiments, the UE does not monitor the PDCCH that schedules the SCell. Where M2 is a positive integer less than or equal to 10 and greater than 0, and the unit is a time slot or a millisecond. In some embodiments, M2 is related to an action delay (or application delay) of a minimum threshold, for example, M2=application delay; in some embodiments, M2 is related to a PDCCH decoding time; in some embodiments, M2 is related to a minimum threshold in the current slot, for example, M2=k0min. In some embodiments, M2 is configured by RRC.

In some embodiments, when the sCellDeactivationTimer is about to expire, that is, the remaining time of the sCellDeactivationTimer is less than M2, the UE does not relax the decoding time of PDCCH, that is, the UE may finish decoding the PDCCH or the DCI in the T3 time slots, where T3 is greater than 0 and less than or equal to 2 (e.g., 1). Where M2 is a positive integer less than or equal to 10 and greater than 0, and the unit is a slot or a millisecond. In some embodiments, M2 is related to an application delay of a minimum threshold, for example, M2=application delay; in some embodiments, M2 is related to a PDCCH decoding time; in some embodiments, M2 is related to a minimum threshold in the current time slot, for example, M2=k0min. In some embodiments, M2 is configured by RRC.

If configured cross-carrier scheduling. In some embodiment, M2 is related to a minimum threshold of a current time slot configured in a scheduling cell. In some embodiment, M2 is related to a minimum threshold of a current time slot configured in a scheduled cell. In some embodiment, M2 is related to at least one of: a maximum minimum threshold of a current time slot configured in a scheduled cell or a SCS. In one embodiment, M2=max {k0min}. In other embodiment, $$M2 = \max\left\{k0 \ \min\frac{2^{\mu PDSCH}}{2^{\mu PDCCH}}\right\}.$$

In other embodiment, $$M2 = \max\left\{k0 \ \min\frac{2^{\mu PUSCH}}{2^{\mu PDCCH}}\right\}$$

In some embodiments, sCellDeactivationTimer is restart/start N2 units after UE receives a PDCCH indicating a new uplink or downlink transmission, where N2 is a positive integer greater than 0 and less than or equal to 10, the units is a time slot or millisecond. In some embodiments, N2 is related to an application delay of the minimum threshold, e.g. N2=application delay, in some embodiments, N2 is related to the PDCCH decoding time, in some embodiments, N2 is related to the minimum threshold in the current slot; in some embodiments, N2 is related to k0 or k2, for example, N2=k0. In some embodiments, N2 is configured by RRC.

In some embodiments, the sCellDeactivationTimer is restart/start after the UE receives a new PDSCH or sends the PUSCH which is indicated by a DCI.

In some embodiments, the sCellDeactivationTimer is restart/start after the UE finish decoding a PDCCH or DCI.

V.(d)

In some embodiments, the base station does not configure the optional minimum threshold for a BWP, and the default minimum threshold for the BWP is 0.

In some embodiments, a BWP with one or two sets of RRC configured minimum threshold values for restriction to the active TDRA table, where each minimum threshold includes at least a minimum threshold of k0 (k0min) and a minimum threshold (k2 min) for k2.

If one or two sets of minimum thresholds are configured before base station (or gNB) transmits RRC reconfiguration signaling (RRCReconfiguration) and/or RRC reconfiguration signaling is configured with one or two sets of minimum thresholds, where the maximum k0min and k2 min of the minimum threshold configured before RRC reconfiguration is (max_k0min1, max_k2min1), the maximum k0min and k2 min of the minimum threshold configured in the reconfiguration signaling is denoted as (max_k0min2, max_k2min2). Then, before the base station receives the RRCReconfigurationComplete sent by the UE, in some embodiments, the k0 indicated by the base station cannot be smaller than max{max_k0min1, max_k0min2}, and the indicated k2 cannot be smaller than max{max_k2min1, max_k2min2}, where max{ } indicates the maximum operate. Where k2 min is the minimum value of k2 and k0min is the minimum value of k0.

If one set of minimum thresholds is indicated by a DCI before base station (or gNB) transmits RRC reconfiguration signaling (RRCReconfiguration) and/or RRC reconfiguration signaling is configured with one or two sets of minimum thresholds, where the maximum k0min and k2 min of the minimum threshold indicate before RRC reconfiguration is (max_k0min1, max_k2min1), the maximum k0min and k2 min of the minimum threshold configured in the reconfiguration signaling is denoted as (max_k0min2, max_k2min2). Then, before the base station receives the RRCReconfigurationComplete sent by the UE, in some embodiments, the k0 indicated by the base station cannot be smaller than max{max_k0min1, max_k0min2}, and the indicated k2 cannot be smaller than max{max_k2min1, max_k2min2}, where max{ } indicates the maximum operate.

V.(e)

The base station indicates a new set of minimum thresholds in slot n by means a first signaling, where the set of minimum threshold includes at least the minimum threshold of k0(k0min) and the minimum threshold for k2(k2 min).

In some embodiments, the minimum threshold indicated in the DCI is invalid before the new set of minimum thresholds are valid, that is, the minimum threshold indicated in the DCI is invalid during the effective delay (or application delay).

In some embodiments, during an application delay, minimum thresholds which are different from the minimum thresholds last indicated may not be indicated. But during an application delay, a cross-BWP scheduling DCI can be received by a UE. That is, during an application delay, a minimum threshold(s) change cause by BWP switch is valid after another application delay. In some embodiments, during an application delay, a minimum threshold(s) change in one BWP is invalid. That is, a communication node does not expect to transmit/receive a new minimum threshold change in one BWP during an application delay.

In some embodiments, the base station sends a minimum threshold indication signaling in the slot n, where a minimum threshold (k0min1) of the K0 indicated by the signaling is valid in the slot n+i, and the base station sends a minimum threshold indication signaling in the slot m, where the signaling indicates a minimum threshold (k0min2) of K0 is valid in slot m+y, where n<m, (n+i)≥(m+y), the UE ignores k0min1 indicated by slot n, that is, k0min1 is invalid. That is, if there is a minimum threshold effective, the minimum threshold indicated before the PDCCH indicating the minimum threshold is invalid.

In some embodiments, the base station sends a minimum threshold indication signal at slot n, which indicates that a minimum threshold of K2 (k2min1) is effective in slot n+i, the base station sends another minimum threshold indication signal at slot m, which indicates a minimum threshold of K2 (k2min2) is effective at slot m+y, where n<m, (n+i)≥(m+y), then UE ignores the k2min1 indicated by slot n, i.e. k2min1 is invalid. That is, if a minimum threshold is in effect, the minimum threshold indicated before the PDCCH indicating that minimum threshold is invalid.

In some embodiments, the application delay T4 for UE change from or to a power saving mode 4 is related to max{Y,Z}(e.g., T4=max{Y,Z}). Where Y is related to a minimum threshold value. Where Z is a fix value related to SCS, that is, that is, the value of Z may be different for different SCS. In some embodiments, the value of Z for a larger SCS is larger than the value of Z for a smaller SCS. The application delay for UE change from a normal mode to a power saving mode 4 is different from the application delay for UE change from a power saving mode 4. In further embodiments, the application delay for UE change from a normal mode to a power saving mode 4 is related to a time of feedback. UE goes to a power saving mode 4 after send an ACK for the data transmission which indicated by the first signaling. In further embodiments, UE ignore the operating mode indication if UE does not correctly decode the PDSCH indicated by the first signaling. In some embodiments, the value Z in the application delay for UE change from a normal mode to a power saving mode 4 is different from the value Z in the application delay for UE change from a power saving mode 4. In further embodiments, the value Z in the application delay for UE change from a normal mode to a power saving mode 4 is greater than the value Z in the application delay for UE change from power saving mode 4. In some embodiments, the value Z in the application delay for UE change from a normal mode to a power saving mode 4 is greater than the time of feedback. In some embodiments, the value Z is configured by RRC signaling. If cross carrier is configured, Y is related to a minimum threshold value act before the first signaling in scheduled CC (or cell) and/or a SCS. For example, $$k0\min \frac{2^{\mu_{ScheduledC\ C}}}{2^{\mu_{PDCCH}}},$$

where $\mu_{ScheduledCC}$ is numerology of scheduled CC, $\mu_{PDCCH}$ is numerology of PDCCH.

In some embodiments, the application delay T4 for UE change from or to a power saving mode 4 is related to max{Y,Z}(e.g., T4=max{Y,Z}). Where Y is related to a minimum threshold value. For cross-carrier scheduling, in some embodiments, the value of Y is related to minimum thresholds for all scheduled component carrier (CC). In further embodiments, the minimum threshold for scheduled CC related to a value ($\Delta$ delta). The $\Delta$ is determined a number of symbols based on PDCCH SCS counting from the end of the last symbol of the received PDCCH symbol to the beginning of the first symbol of the corresponding received PDSCH, quantized (using the granularity of PDSCH slot duration) to the next PDSCH slot boundary. In some embodiments, the minimum threshold for a scheduled CC i is max{k0minscheduledCCi, k0mindeltai}. k0minscheduledCCi is k0min indicated in the scheduled CC i, k0mindeltai is k0min related to a delta value.

In some embodiments, $$k0\text{mindelta} = k0\min{}^{delta_i} = \left\lceil \frac{(S_{PDCCH} + \Delta)}{N_{symbol_i}} \frac{2^{\mu_{PDSCH_i}}}{2^{\mu_{PDCCH}}} \right\rceil,$$

SPDCCH is the symbol number of the end of the last symbol of the received PDCCH, Nsymboli is the number of symbol in one slot in the scheduled CC i, µPDSCHi is the numerology of scheduled CC i, µPDCCH is the numerology of scheduling CC. In some embodiments, the minimum threshold for a scheduled CC i is 0 or A, A is related to the numerology of scheduled CC and the numerology of scheduling CC. In some embodiments, A is a fixed value. In some embodiments, A=1. In some embodiments, the minimum threshold for a scheduled CC i is 0 or 1.

In some embodiments, $$Y = \min\left\{\max\{k0\min{}^{scheduledC\ C_i}, k0\min{}^{delta_i}\}\frac{2^{\mu_{PDSCH_i}}}{2^{\mu_{PDCCH}}}\right\}.$$

In some embodiments, $$Y = \min\left\{k0\min{}^{scheduledC\ C_i} \frac{2^{\mu_{PDSCH_i}}}{2^{\mu_{PDCCH}}}, k0\min{}^{delta_i}\right\}.$$

In some embodiments, the application delay T4 for UE change from or to a power saving mode 4 is related to max{Y,Z}(e.g., T4=max{Y,Z}). Where Y is related to a minimum threshold value (k0min$_{pri}$) of the active DL BWP prior to the change indication in scheduled CC. In some embodiments, Y is related to K0min$_{pri}$ and a delta value ($\Delta$). In some embodiments, Y=operation(k0min$_{pri}$*B), B is greater than or equal to 0. In some embodiments, $$B = \frac{2^{\mu_{PDSCH}}}{2^{\mu_{PDCCH}}},$$

µPDSCH is the numerology of BWP of PDSCH, $\mu_{PDCCH}$ is the numerology of BWP of PDCCH. In some embodiments, operation( ) is round down or round up. In some embodiments, Y=k0min$_{pri}$*B, B is greater than or equal to 0. In some embodiments, $$B = \frac{2^{\mu_{scheduledC\ C}}}{2^{\mu_{scheduling\ CC}}},$$

$\mu_{scheduledCC}$ is the numerology of BWP of PDSCH, $\mu_{schedulingCC}$ is the numerology of BWP of PDCCH. In some embodiments, Y=operation(max(k0min$_{pri}$,H)*B), B is greater than or equal to 0, operation( ) is round up or round down, H is related to A. In some embodiments, $$H = \left\lceil \frac{(S_{PDCCH} + \Delta)}{N_{symbol_i}} \frac{2^{\mu_{PDSCH_i}}}{2^{\mu_{PDCCH}}} \right\rceil.$$

In an example, B is greater than or equal to and less than 10.

In some embodiments, for cross-carrier scheduling, the value of Y in application delay for all scheduled CC is U, where U is greater than 0. In some embodiments, U is related to a minimum value act before the first signaling in scheduling CC. In some embodiments, U is related to a minimum value act before the first signaling among all scheduled CCs and or a SCS. For example, $$U = \text{operate}\left\{\max\left\{K0\min\ i\frac{2^{\mu_{scheduledCCi}}}{2^{\mu_{PDCCH}}}\right\}\right\},$$

operate{ } is round down or round up. K0mini is k0min in scheduled CCi. $\mu_{scheduledCCi}$ is numerology of scheduled CCi. In some embodiments, U is 1. In some embodiments, U is configured by high layer signaling.

For cross-carrier scheduling, if a minimum value indicated for a scheduled cell in slot n is not applied after the scheduling cell finish a BWP switching, that is, if the scheduling cell finish BWP switching during an application delay for a scheduled CC, UE can be scheduled with the indicated minimum value(s) for PDSCH/PUSCH on the scheduled cell in a DCI in slot I of the scheduling cell. In some embodiments, $$I = \text{operation}\left\{(n+X)\frac{2^{\mu_{BWP2}}}{2^{\mu_{BWP1}}}\right\},$$

operation is bound up or bound down, $\mu_{BWP2}$ is numerology of current BWP which scheduling CC switch to, $\mu_{BWP2}$ is numerology of prior BWP which scheduling CC switch from. Wherein X is an application delay value. If a minimum value indicated for a scheduled cell in slot n is applied before the scheduling cell finish a BWP switching, UE can be scheduled with the indicated minimum value(s) for PDSCH/PUSCH on the scheduled cell in a DCI in slot I of the scheduling cell. In an example, I=n+X. Wherein X is an application delay value.

In some embodiments, for cross-carrier scheduling, change of applied minimum scheduling offset restriction indication carried by DCI in slot n in a serving cell, will be applied in slot n+X. Wherein X is an application delay value. In an example, X is number of slots, where the SCS of the X slots is reference to the SCS of the serving cell in slot n. In an example, the application delay X is number of slots, if the serving cell finish a BWP switching during the application delay, the SCS of the application delay is reference to the SCS of the serving cell in the old BWP.

V.(f)

The base station indicates a new set of minimum thresholds in slot n, where the set of minimum thresholds includes at least a minimum threshold (k0min) of k0 and a minimum threshold (k2 min) of k2.

If a new set of minimum thresholds is indicated and there is at least one minimum threshold information greater than 0, then In some embodiments, when monitoring the PDCCH in the search space or CORESET associated with the DCI format 2_1, the UE can complete PDCCH decoding in the T4 time slot. In some embodiments, T4 is related to the monitoring period of DCI format 2_1. In some embodiments, T4=1. In some embodiments, T4 is related to K1 (e.g., T4<K1).

V.(g)

The base station indicates a new set of minimum thresholds in slot n by a first signaling, where the set of minimum thresholds includes at least a minimum threshold (k0min) of k0 and a minimum threshold (k2 min) of k2.

If there is at least one minimum threshold information greater than 0,

If a first signaling include a field used to indicate switching to/from dormant BWP configured for one or more Scells. The transition time for SCelli switching to/from dormant BWP is record as $T_{dormancyswitchdelayi}$.

In some embodiments, PS-offset is larger than C, where C is greater than 0, units in slots or milliseconds. In some embodiments, C is related to a minimum threshold, for example, C=k0min. In some embodiments, C is related to a minimum value and a SCS, for example, $$C = k0\min\frac{2^{\mu_{PDSCH}}}{2^{\mu_{PDCCH}}}.$$

In an example, C is greater than 0 and less than 100.

The switch delay for SCelli switch between dormancy and non-dormancy behavior is related to at least one of the following: a BWP switch delay, a SCS, a search space, a minimum value, a high layer signaling.

In some embodiments, the switch delay($T_{dormancyswitchdelayi}$) for SCelli switch between dormancy and non-dormancy behavior is greater than or equal to the BWP switch delay. In some embodiments, $T_{dormancyswitchdelayi}$ is related to k0min, for example, $T_{dormancyswitchdelayi}$=BWP switch delay +A. in some embodiments, A is related to K0min. In some embodiments, A=k0min*a, where a is greater than 0. In some embodiments, a is related to a SCS. In some embodiments, k0min is the minimum value of K0 in SCelli. In some embodiments, k0min is the minimum value of K0 act before indication in PCell. SCelli is a SCell with index i. In an example, a is greater than 0 and less than 5.

In some embodiments, the switch delay for SCell switch from dormancy to non-dormancy behavior is different with the switch delay for SCell switch from non-dormancy to dormancy behavior.

In some embodiments, the switch delay ($T_{dormancyswitchdelayi}$) for SCelli switch between dormancy and non-dormancy behavior in cross-slot scheduling is greater than the switch delay($T_{dormancyswitchdelayi\_normal}$) for SCelli switch between dormancy and non-dormancy behavior in normal mode. In some embodiments, $T_{dormancyswitchdelayi}$ is related to k0min, for example, $T_{dormancyswitchdelayi}=T_{dormancyswitchdelayi\_normal}+k0\min*a$, where a is greater than 0. In some embodiments, a is related to a SCS. In an example, a is greater than 0 and less than 5. In some embodiments, $T_{dormancyswitchdelayi}=T_{dormancyswitchdelayi\_normal}+b$, where b is greater than 0. In an example, b is greater than 0 and less than 5. In some embodiments, k0min is the minimum value of K0 in SCelli. In some embodiments, k0min is the minimum value of K0 act before indication in PCell. In some embodiments, $T_{dormancyswitchdelayi}=T_{dormancyswitchdelayi\_normal}*c$, where c is greater than 0 an less than 3.

V.(h)

The base station indicates a set of minimum thresholds in slot n, where the set of minimum thresholds includes at least a minimum threshold (k0min) of k0 and a minimum threshold (k2 min) of k2.

If cross-carrier scheduling is configured. In some embodiments, the minimum threshold(k0min) of k0 and minimum threshold (k2 min) of k2 for scheduled CC (or scheduled cell) and scheduling CC (or scheduling cell) satisfy a constraint condition. Where the constraint condition is the times obtained by formula conversion of k0mins for scheduled CC and scheduling CC is the same. In some embodiments, the constraint condition is the times obtained by formula conversion of k0mins for scheduled CC are greater than the time obtained by formula conversion of k0min for scheduling CC. In some embodiments, the time $T_k$ obtained by formula conversion of k0min in CC i is $T_k$=k0min $T_{slot}$, where $T_{slot}$ is the time of one slot in a CC i, units in millisecond.

In some embodiments, a third parameter value in power saving mode 4 is different from the value in other operating mode. a third parameter value in power saving mode 4 is recorded as $T_{mode4}$ and a third parameter value in other operating mode is recorded as $T_{mode}$. A third parameter value is at least one of the following: a BWP switch delay, a timeDurationForQCL, an interruption time. In some embodiments, $T_{mode4}$ is related to at least one of: $T_{mode}$, or a minimum value act before the first signaling in a scheduling component carrier (CC), or a SCS, or a fixed value, or a minimum value act before the first signaling in a scheduled CC. In some embodiments, $T_{mode4}=T_{mode}+$k0mini*P, where P is greater than 0. In some embodiments, P is related to a SCS, for example, $$P = \frac{2^{\mu ScheduledCC}}{2^{\mu PDCCH}}.$$

In an example, P is greater than 0 and less than 10. In some embodiments, P is a fixed value configured by high layer signaling. In some embodiments, $T_{mode4}=T_{mode}*P2$, where P2 is greater than 0. In an example, P2 is greater than 0 and less than 10. In some embodiments, P2 is a fixed value configured by high layer signaling. In some embodiments, P2 is related to a SCS. In some embodiments, $T_{mode4}=T_{mode}+P3$, where P3 is greater than 0. In an example, P3 is greater than 0 and less than 30. In some embodiments, P3 is related to a SCS and a minimum value act before the first signaling in a scheduled CC. In some embodiments, P3 is a fixed value. In some embodiments, P3 is a value configured by high layer signaling.

In some embodiments, if a cross-carrier scheduling is configured and a DCI indicate cross-carrier scheduling, k0min is a minimum value of K0 in a scheduling CC, k2 min is a minimum value of K2 in a scheduling CC.

In some embodiments, if a cross-carrier scheduling is configured and a DCI indicate cross-carrier scheduling, k0min is a minimum value of K0 in a scheduled CC, k2 min is a minimum value of K2 in a scheduled CC.

In some embodiments, a scheduled cell is record as a scheduled CC, a scheduling cell is record as a scheduling CC.

Figure 4:
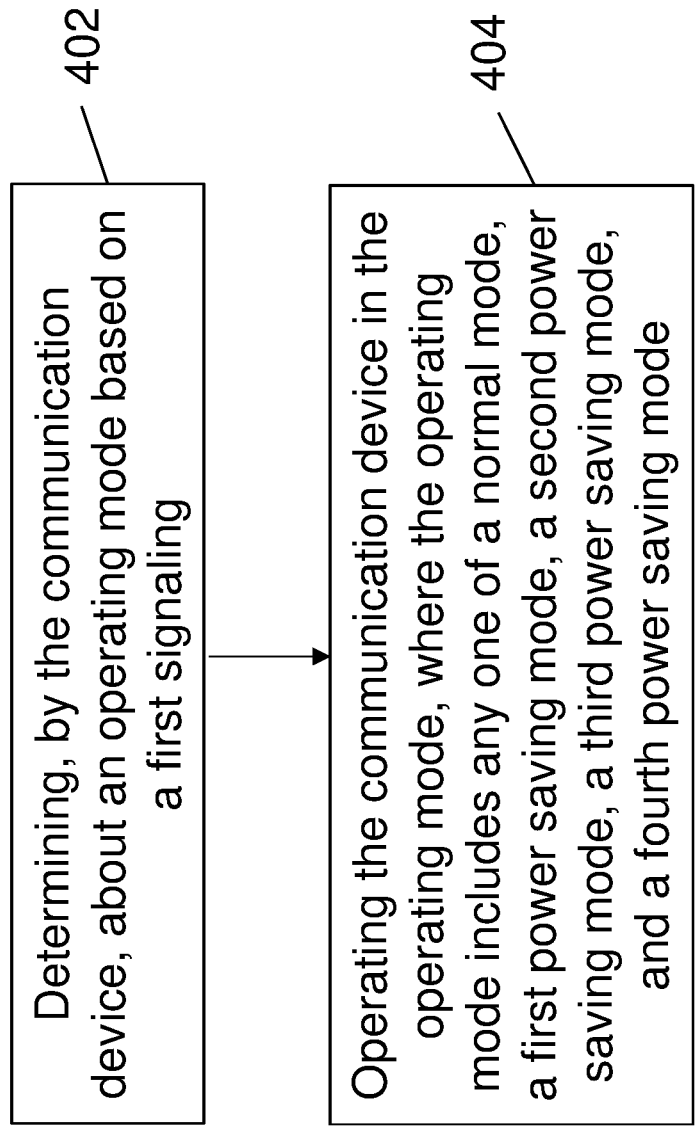
FIG. 4 shows an exemplary flowchart for determining operating mode of a communication device.

FIG. 4 shows an exemplary flowchart for determining operating mode of a communication device (e.g., UE). At the performing operation 402, the UE determines an operating mode based on a first signaling. At the operating operation 404, the UE operates the communication device in the operating mode, where the operating mode includes any one of a normal mode, a first power saving mode (described as power saving mode 1 in this patent document), a second power saving mode (described as power saving mode 2 in this patent document), a third power saving mode (described as power saving mode 3 in this patent document), and a fourth power saving mode (described as power saving mode 4 in this patent document).

In some embodiments, the determining is made based on any one or more of: (1) a reception of the first signaling, (2) an information field in the first signaling, or (3) information indicated by a second preset parameter received by the communication device. In some embodiments, the communication device determines to operate in the normal mode upon detecting the reception of the first signaling, the first signaling includes an uplink or a downlink data transmission indication, and the communication device determines to operate in the second power saving mode upon detecting an absence of the first signaling.

In some embodiments, the operating mode includes the normal mode in which the communication device monitors a downlink control channel according to a period and an offset. In some embodiments, the operating mode includes the first power saving mode (or power saving mode 1) in which the communication device does not monitor a downlink control channel scrambled by at least some radio network temporary identifier.

In some embodiments, the operating mode includes the second power saving mode (or power saving mode 2) in which the communication device does not monitor a downlink control channel. In some embodiments, the operating mode includes the third power saving mode (or power saving mode 3) in which the communication device monitors a downlink control channel according to a preset monitoring configuration for the downlink control channel.

In some embodiments, the preset monitoring configuration for the downlink control channel includes at least one of a monitoring periodicity for the downlink control channel, a monitoring offset for the downlink control channel, or a number of consecutive slots that a search space lasts in every occasion.

In some embodiments, the operating mode includes the fourth power saving mode (or power saving mode 4) in which the communication device is configured to: not transmit or detect a downlink control information (DCI) that indicates a parameter K0 that is less than the minimum value for the parameter K0, and not transmit or detect a DCI that indicates a parameter K2 that is less than the minimum value for the parameter K2, and does not transmit or detect a DCI that indicates a CSI triggering state in which CSI-RS triggering offset is less than the minimum value for the parameter K0.

In some embodiments, the first signaling includes any one of a wake-up indication information, minimum threshold indication information for parameter K0 and parameter K2, an uplink or downlink data transmission indication, a bandwidth part (BWP) identifier (ID), a secondary cell (SCell) dormancy behavior indication, a SCell non-dormancy behavior indication, and a maximum multiple-input multiple-output (MIMO) layer indication information.

In some embodiments, the wake-up indication information includes one or more bits, and where a trigger state indicated by the wake-up indication information is configured by a high-layer signaling. In some embodiments, the communication device determines that the operating mode is the fourth power saving mode in response to determining that a minimum threshold indication information for the parameter K0 and the parameter K2 is greater than zero.

In some embodiments, the operating mode includes the fourth power saving mode, and where the communication device operating in the fourth power saving mode is configured not to monitor a downlink control channel in response to determining that a remaining time of a drx-onDurationTimer or a drx-InactivityTimer or a bandwidth part (BWP) inactivity timer or a SCellDeactivationTimer is less than M slots or milliseconds, where M is a positive integer of greater than zero or less than or equal to 10.

In some embodiments, the operating mode includes the fourth power saving mode, and where the communication device operating in the fourth power saving mode is configured to decode a downlink control channel within one-slot in response to determining that a remaining time of a drx-onDurationTimer or a drx-InactivityTimer or a bandwidth part (BWP) inactivity timer or a SCellDeactivationTimer is less than M slots or milliseconds, where M is a positive integer of greater than zero or less than or equal to 10.

In some embodiments, the communication device determines to operate in the operating mode based on information indicated by the first signaling and the second preset parameter, and where the second preset parameter includes any one of a bandwidth part (BWP) identifier (ID), a search space, a downlink control information (DCI) format, a radio network temporary identifier (RNTI), a higher layer signaling, or a timer. In some embodiments, the second preset parameter is BWP ID, where either the first signaling is received and includes a do not wake-up indication information, or the first signaling is not detected, and where the communication device operates in the second power saving mode upon determining that an active BWP is an initial BWP or a default BWP or a first BWP of a primary cell (PCell).

In some embodiments, the second preset parameter is BWP ID, where either the first signaling is received and includes a do not wake-up indication information, or the first signaling is not detected, and where the communication device operates in the first power saving mode upon determining that an active BWP is not an initial BWP or a default BWP or a first BWP of a primary cell (PCell). In some embodiments, the second preset parameter is a timer, where the communication device, upon determining that the timer has expired, operate in the first power saving mode.

In some embodiments, the first signaling is received from a primary cell (PCell) and/or a primary secondary cell (PSCell), where the operating mode is configured to operate on PCell and/or the PSCell. In some embodiments, the downlink control channel is a physical downlink control channel (PDCCH). In some embodiments, the DCI is scrambled by at least one of cell radio network temporary (C-RNTI), configured scheduling RNTI (CS-RNTI) or modulation coding scheme RNTI (MCS-RNTI).

Figure 5:
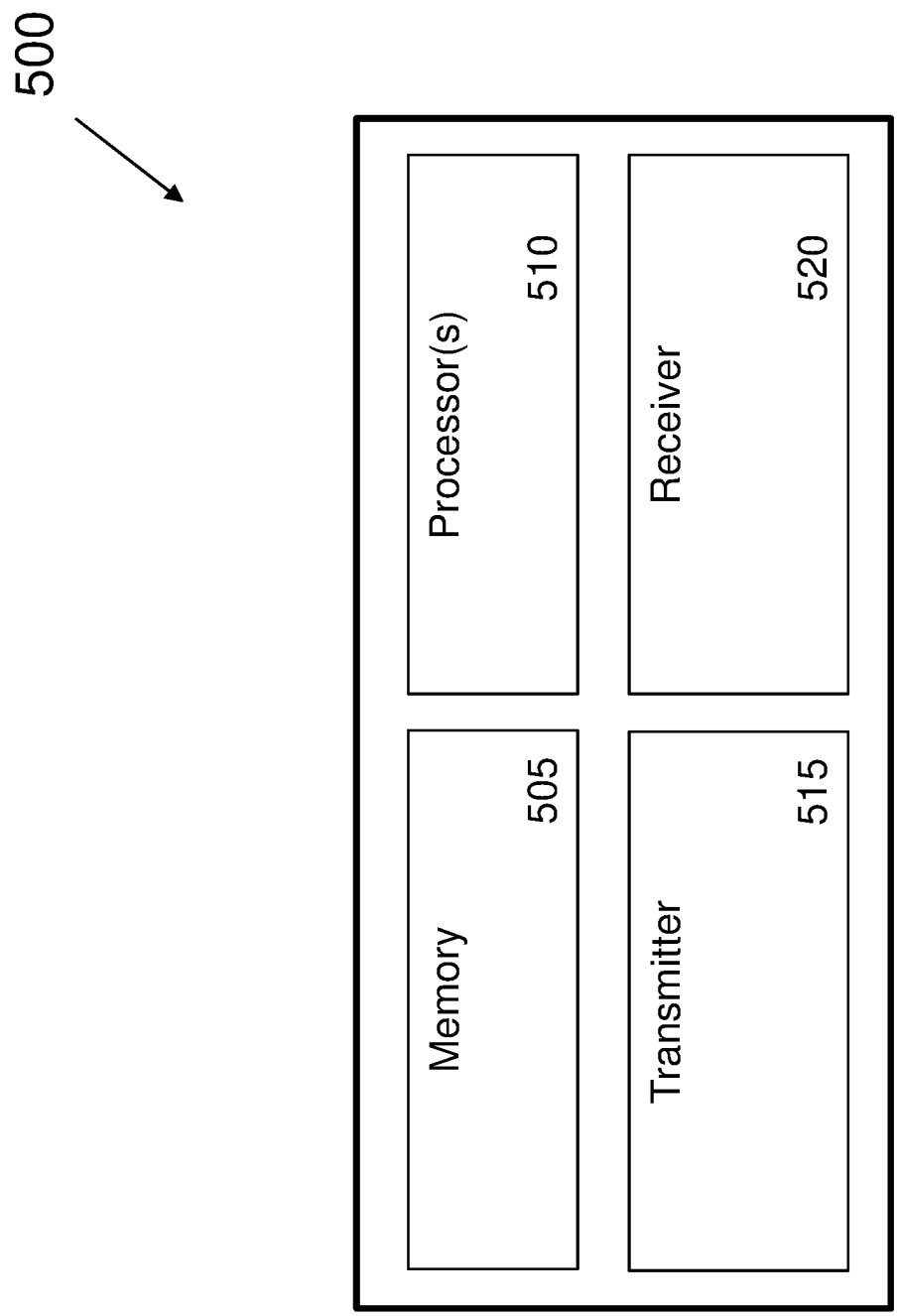
FIG. 5 shows an exemplary block diagram of a hardware platform 500 that may be a part of a user equipment.

FIG. 5 shows an exemplary block diagram of a hardware platform 500 that may be a part of a communication device (e.g., UE). The hardware platform 500 includes at least one processor 510 and a memory 505 having instructions stored thereupon. The instructions upon execution by the processor 510 configure the hardware platform 500 to perform the operations described in FIGS. 1 to 4 and in the various embodiments described in this patent document. The transmitter 515 transmits or sends information or data to another node. For example, a communication device transmitter can send a message to a base station. The receiver 520 receives information or data transmitted or sent by another node. For example, a communication device can receive a first signaling or second preset parameter from a network node (e.g., base station).

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
receiving, by a communication device, a signaling comprising a first information field that indicates to the communication device to not start a drx-onDurationTimer in a discontinuous reception (DRX) cycle that includes a DRX on-duration period, wherein a duration of the DRX on-duration period is same as the drx-onDurationTimer, and wherein the DRX cycle is a next long DRX cycle; and
performing, by the communication device, channel state information (CSI) measurement and CSI reporting during the DRX on-duration period that is included in the DRX cycle in which the drx-onDurationTimer is not started.

2. The method of claim 1,
wherein the signaling includes a second information field which comprises a SCell dormancy indication; and
wherein the method further comprising:
receiving, by the communication device, a parameter comprising a starting position of the first information field and the second information field in the signaling.

3. The method of claim 1, wherein the performing, by the communication device, the CSI measurement and the CSI reporting during the DRX on-duration period comprises performing measurement on a subset of N1 CSI reference resources during the DRX on-duration period.

4. The method of claim 1, wherein the CSI reporting is performed via a Physical Uplink Control Channel (PUCCH).

5. A communication device for wireless communication, comprising:
a processor and a memory having instructions stored thereupon, the instructions upon execution by the processor configure the communication device to:
receive a signaling comprising a first information field that indicates to the communication device to not start a drx-onDurationTimer in a discontinuous reception (DRX) cycle that includes a DRX on-duration period, wherein a duration of the DRX on-duration period is same as the drx-onDurationTimer, and wherein the DRX cycle is a next long DRX cycle; and
perform channel state information (CSI) measurement and CSI reporting during the DRX on-duration period that is included in the DRX cycle in which the drx-onDurationTimer is not started.

6. The communication device of claim 5,
wherein the signaling includes a second information field which comprises a SCell dormancy indication; and
wherein the processor further configures the communication device to:
receive a parameter comprising a starting position of the first information field and the second information field in the signaling.

7. The communication device of claim 5, wherein the perform the CSI measurement and the CSI reporting during the DRX on-duration period comprises perform measurement on a subset of N1 CSI reference resources during the DRX on-duration period.

8. The communication device of claim 5, wherein the CSI reporting is performed via a Physical Uplink Control Channel (PUCCH).

9. A non-transitory computer readable program storage medium having code stored thereon, the code, when executed by a processor, causing the processor to implement a method, comprising:
receiving, by a communication device, a signaling comprising a first information field that indicates to the communication device to not start a drx-onDurationTimer in a discontinuous reception (DRX) cycle that includes a DRX on-duration period, wherein a duration of the DRX on-duration period is same as the drx-onDurationTimer, and wherein the DRX cycle is a next long DRX cycle; and
performing, by the communication device, channel state information (CSI) measurement and CSI reporting during the DRX on-duration period that is included in the DRX cycle in which the drx-onDurationTimer is not started.

10. The non-transitory computer readable program storage medium of claim 9,
wherein the signaling includes a second information field which comprises a SCell dormancy indication; and
wherein the method further comprising:
receiving, by the communication device, a parameter comprising a starting position of the first information field and the second information field in the signaling.

11. The non-transitory computer readable program storage medium of claim 9, wherein the performing, by the communication device, the CSI measurement and the CSI reporting during the DRX on-duration period comprises performing measurement on a subset of N1 CSI reference resources during the DRX on-duration period.

12. The non-transitory computer readable program storage medium of claim 9, wherein the CSI reporting is performed via a Physical Uplink Control Channel (PUCCH).

* * * * *